(12) United States Patent
Benta

(10) Patent No.: US 12,528,414 B2
(45) Date of Patent: Jan. 20, 2026

(54) LIFTING DEVICE FOR INTEGRATING INTO A HATCHBACK OF A MOTOR VEHICLE, LOADING BASE MODULE, AND SYSTEM FOR LOADING AND UNLOADING A MOTOR VEHICLE

(71) Applicant: BONTINTA SYSTEMS ENGINEERING SERVICES GMBH, Vaterstetten (DE)

(72) Inventor: Daniel Benta, Vaterstetten (DE)

(73) Assignee: BONTINTA SYSTEMS ENGINEERING SERVICES GMBH, Vaterstetten (DE)

( * ) Notice: Subject to any disclaimer, the term of this patent is extended or adjusted under 35 U.S.C. 154(b) by 419 days.

(21) Appl. No.: 18/043,292

(22) PCT Filed: Jul. 30, 2021

(86) PCT No.: PCT/EP2021/071475
§ 371 (c)(1),
(2) Date: Feb. 27, 2023

(87) PCT Pub. No.: WO2022/048834
PCT Pub. Date: Mar. 10, 2022

(65) Prior Publication Data
US 2024/0025346 A1 Jan. 25, 2024

(30) Foreign Application Priority Data
Sep. 7, 2020 (DE) .................... 10 2020 005 485.4
Jan. 25, 2021 (DE) .................... 10 2021 101 477.8

(51) Int. Cl.
*B60P 1/54* (2006.01)
*B60P 1/00* (2006.01)
*B60R 5/04* (2006.01)

(52) U.S. Cl.
CPC ................ *B60R 5/04* (2013.01); *B60P 1/003* (2013.01); *B60P 1/54* (2013.01)

(58) Field of Classification Search
CPC ..................................... B60P 1/54; B60R 5/04
See application file for complete search history.

(56) References Cited

U.S. PATENT DOCUMENTS

| 4,002,321 A | 1/1977 | Shaw et al. |
| 4,969,793 A | 11/1990 | Pawl |
(Continued)

FOREIGN PATENT DOCUMENTS

| CN | 106427725 A | 2/2017 |
| CN | 207328086 U | 5/2018 |
(Continued)

OTHER PUBLICATIONS

ISA European Patent Office, International Search Report Issued in Application No. PCT/EP2021/071475, Dec. 13, 2021, WIPO, 9 pages.

(Continued)

*Primary Examiner* — Jonathan Snelting
(74) *Attorney, Agent, or Firm* — McCoy Russell LLP

(57) ABSTRACT

The invention relates to a lifting device for integrating into a hatchback of a motor vehicle, comprising an electric motor-operated traction cable system consisting of at least one load cable, at least one electric motor-driven receiving roller for winding and unwinding the load cable, and a cable guide, by means of which at least two parallel cable sections can be guided out of the hatchback in the direction of the base, wherein the parallel running cable sections are connected at the end face by means of a support rod in the form of a load receiving means.

14 Claims, 16 Drawing Sheets

(56) References Cited

U.S. PATENT DOCUMENTS

| | | | |
|---|---|---|---|
| 5,054,578 | A | 10/1991 | Smillie, III et al. |
| 5,064,335 | A * | 11/1991 | Bergeron .................. B60P 1/003 |
| | | | 224/403 |
| 5,209,435 | A | 5/1993 | Edwards |
| 5,454,684 | A * | 10/1995 | Berens ....................... B60P 1/04 |
| | | | 296/26.1 |
| 5,456,511 | A | 10/1995 | Webber |
| 6,065,792 | A | 5/2000 | Sciullo |
| 7,543,873 | B1 | 6/2009 | Thornsberry |
| 7,810,790 | B2 | 10/2010 | Kazerooni |
| 8,398,358 | B2 | 3/2013 | L'Ecuyer |
| 9,114,876 | B1 * | 8/2015 | Cockell, II ................ B64D 9/00 |
| 10,500,933 | B2 * | 12/2019 | Newman ................. B60R 11/00 |
| 10,532,774 | B2 * | 1/2020 | Walser .................... B60P 1/003 |
| 2003/0141733 | A1 | 7/2003 | Burg |
| 2006/0151765 | A1 | 7/2006 | Kazerooni |
| 2018/0326887 | A1 | 11/2018 | Newman |
| 2020/0047675 | A1 | 2/2020 | Ellis et al. |

FOREIGN PATENT DOCUMENTS

| | | |
|---|---|---|
| CN | 108621760 A | 10/2018 |
| DE | 19731324 A1 | 3/1999 |
| DE | 19815466 A1 | 10/1999 |
| DE | 10006617 C1 | 7/2001 |
| DE | 10012767 A1 | 10/2001 |
| DE | 10054572 A1 | 5/2002 |
| DE | 10312466 A1 | 10/2004 |
| DE | 102004051622 A1 | 4/2006 |
| DE | 202009014248 U1 | 3/2010 |
| DE | 202015105898 U1 | 2/2017 |
| DE | 202017104722 U1 | 8/2017 |
| EP | 1145908 A2 | 10/2001 |
| EP | 2193958 A1 | 6/2010 |
| FR | 3010967 A1 | 3/2015 |
| WO | 03080394 A2 | 10/2003 |
| WO | 2020060473 A1 | 3/2020 |

OTHER PUBLICATIONS

Canadian Intellectual Property Office, Office Action Issued in Application No. 3,193,301, Jun. 12, 2024, 7 pages.

* cited by examiner

LIFTING DEVICE FOR INTEGRATING INTO A HATCHBACK OF A MOTOR VEHICLE, LOADING BASE MODULE, AND SYSTEM FOR LOADING AND UNLOADING A MOTOR VEHICLE

CROSS REFERENCE TO RELATED APPLICATIONS

The present application is a U.S. National Phase of International Application No. PCT/EP2021/071475 entitled "LIFTING DEVICE FOR INTEGRATING INTO A HATCHBACK OF A MOTOR VEHICLE, LOADING BASE MODULE, AND SYSTEM FOR LOADING AND UNLOADING A MOTOR VEHICLE," and filed on Jul. 30, 2021. International Application No. PCT/EP2021/071475 claims priority to German Patent Application No. 10 2020 005 485.4 filed on Sep. 7, 2020, and to German Patent Application No. 10 2021 101 477.8 filed on Jan. 25, 2021. The entire contents of each of the above-listed applications are hereby incorporated by reference for all purposes.

TECHNICAL FIELD

The invention relates to an integrated load loading device for motor vehicles that have an upwardly opening trunk lid or loading space door.

BACKGROUND AND SUMMARY

Although many devices have been described in the patent literature that are intended for the relief of the user in loading and unloading activities, no such devices can be seen in the currently licensed passenger vehicles. No vehicle manufacturer offers such an option for passenger vehicles, neither as a feature variant or as a retrofitting option, even though the usefulness of such a solution is self-evident.

There are, for example, retrofitting options for the installation of extendable loading floors/drawers for commercial vehicles. However, no solution for the lifting or lowering of the cargo load is offered here. The reasons for this may be the mechanical complexity of the systems, the maintenance effort in operation, and the high modification effort of the vehicle (of the trunk).

Different systems for a simplified loading and unloading of the loading space have now been described in the patent literature such as, for example in DE10312466A1, DE10012767A1, EP1145908A2, DE19731324A1, DE10054572A1, DE10006617C1 or DE19815466A1. The technical teachings of these documents do not go beyond devices that enable an extension and retraction of the movable loading floor either via lifting devices or roller guides and that secure the position of the loading floor via lever mechanisms. These loading floors are mostly vertically adjustable, an aspect that makes the mechanical implementation laborious, maintenance-intensive, and cumbersome. A further problem of these devices is also that they do not offer any, or hardly any, relief for the user on the loading and unloading of heavy load items.

Various system for a simplified loading and unloading of the loading space have additionally been described in EP2193958A1, U.S. Pat. No. 4,969,793, 5,054,578 or 8,398,358 that are based on the use of loading frames that convey baggage items into the baggage space by the reversible extraction of a basket frame. The problem with these devices is that they are relatively complex mechanical structures having a number of movable parts that require complex servicing and putting into operation and that take up a substantial volume of the trunk when not in use or require a complex installation and removal.

A crane-like lifting device is known from U.S. Pat. No. 7,810,790. It is a lifting device that is fixed in place at the trunk roof or at the hatchback. However, what this concept does not take into account is that with load weights that make the use of a lifting device, high strains necessarily occur that require an overdimensioning of the hatchback frame (the main load acts centrally on the hatchback, with the support points that transfer the main load on the vehicle frame being attached laterally to the hatchback). In this case, the hatchback is exposed to a considerable bending moment with higher loads. An insertion of the lifting device at the trunk top, as shown in FIG. 2 of the US patent, requires the interaction of the user who has to orientate the load and push it into/fetch it out of the trunk by an additional use of force. Additional risks of injury thus arise (jamming and squeezing risk).

It is the underlying object of the invention to provide a loading system for the trunk/cargo area of a vehicle that relieves the user in the lifting, loading, unloading, and lowering of heavy baggage items.

The object is achieved in accordance with the invention by a lifting device in accordance with the features of claim 1. Advantageous embodiments of the lifting device are the subject of the dependent claims. A further aspect of the invention relates to the loading floor module having the features of claim 11 and to its advantageous embodiments, specified in the respective dependent claims. The system in accordance with the invention for the loading and unloading of a vehicle results from the combination of the two individual components.

In accordance with the invention, a lifting device for integration in a hatchback of a motor vehicle is proposed. The lifting device comprises an electric motor pull rope system for raising and lowering at least one load that has been taken up. The device has at least one load cable for this purpose that can be reeled up and unreeled by means of at least one take up roller. The at least one take up roller can be integrated in the hatchback of a vehicle so that the load cable can be let down in the direction of the floor in the region of the vehicle rear to take up a load positioned there with an open hatchback. At least two parallel cable harnesses are led from or out of the hatchback in the direction of the floor for an optimized load distribution. The ends of the cable harnesses are connected to one another via a cross rod that serves as a load reception point for the fastening of the load. The attached load or the load force is distributed over the parallel harnesses via the cross rod.

The cable harnesses are ideally led out of the hatchback in the region of its outer ends, i.e. the distance between the cable harnesses is at a maximum. The device comprises suitable guide means that can ideally be integrated in the marginal regions of the hatchback.

To simplify the installation and in particular for a possibility of a simple retrofitting of any desired passenger car types, at least one installation frame is provided at which the at least one take up roller, including the electric motor drive and, optionally, the cable guide are supported. The installation frame is preferably designed such that it extends practically over the entire width of the hatchback (transverse vehicle axis) in the installation position within the hatchback. The installation frame not only simplifies the installation of the lifting device, but also additionally strengthens or stiffens the body of the hatchback. This is in particular desirable for the lifting of heavy loads since otherwise a distortion of the existing hatchback body is possible. It is particularly advantageous if the guide means are supported at the outer ends of the installation frame, i.e. at a maximum distance from one another at the installation frame.

The cable guide per cable harness can have a respective roller arrangement in accordance with an advantageous embodiment to guide the load cable out of the hatchback at the desired exit point, with the roller arrangements being supported at the free ends of the installation frame, while the at least one take up roller is supported centrally between the roller arrangements at the installation frame. An optimum, ideally symmetrical load distribution over the installation frame thereby results.

The load cable can consist of one cable. However, a design by means of two separate cables or separate cable sections of the same length is preferred. In this case, the take up roller comprises two reels disposed next to one another on the roller axis for winding the cable or cable sections ups and down. The separate cable sections are wound up or down in opposite direction on the respectively associated reel by the rotational movement.

The electric motor drive of the take up roller can be formed by an electric motor, preferably in the form of a spindle drive. In addition, at least one transmission and at least one brake, in particular an electromechanical brake, can be provided. The latter serves the implementation of an emergency brake and release function in the event of a previously triggered emergency braking. It is equally conceivable to use a suitable sensor system for measuring the load weight taken up and/or the stroke distance and/or the operating temperature of the drive.

Provision can be made in accordance with a particularly advantageous embodiment that at least one, preferably two, positioning elements are provided that are supported at the end side at the installation frame of the lifting device and whose other end is supported at the vehicle frame of the motor vehicle. A direct force transmission from the installation frame into the vehicle body is hereby made possible and the hatchback of the vehicle, that is comparatively prone to torsion, is protected from too high a force input. The positioning elements can be designed as desired, for example as a linkage. The only requirement is a satisfactory force transmission into the vehicle body. In this connection, the vehicle body is understood as the vehicle frame, in particular the supporting vehicle structure, without the hatchback.

In a preferred embodiment, the at least one positioning element can comprise lever kinematics that are adjustable by an opening/closing movement of a vehicle hatchback. The lever kinematics can in particular be independently adjustable during the movement of the hatchback, either guided by the movement of the hatchback or optionally driven by a drive. Alternatively to lever kinematics, it is also conceivable in accordance with a simplified embodiment to design the positioning elements as simple rods or supports that have to be manually moved by the user into the desired supporting position for the force removal from the installation frame into the vehicle body. An embodiment is conceivable in this case having one or more joints that permit an inward or outward folding of the supports.

It may be sensible for safety reasons to have at least one fixing means for at least one positioning element available to lock the positioning means in the supporting position for the force removal from the installation frame into the vehicle body. The status of the fixing means is sensibly monitored with sensor support to in particular also influence the drive control of the lifting device.

As indicated above, the lever kinematics can comprise a separate drive for the adjustment. Such a drive can be of an electric or electrohydraulic nature.

The lifting device can preferably comprise a separate control unit that is ideally equipped with as suitable interface for linking to an existing bus system of a motor vehicle. The control unit comprises an associated operating module for actuating the drive of the lifting device for unwinding and winding up the load cable. A software based solution for the control unit bus conceivable that is configured to control a release of the electric motor drive of the take up roller in accordance with an operating concept and/or in dependence on the state of the positioning elements, or of the lever kinematics, and/or of the vehicle.

There is the option of arranging control elements for the manual control of the control unit and thus of the lifting device directly on the vehicle, in particular in the region of the hatchback. Alternatively or additionally, mobile solutions are conceivable, for example by means of remote radio control, in particular by means of the vehicle key, and/or app based by means of a mobile end device such as a smartphone, wearable, table, laptop, etc.

In addition to the lifting device in accordance with the invention, the invention equally relates to a loading floor module for integration in the trunk of a motor vehicle. The proposed loading floor module is preferably usable in combination with the lifting device, each equally as an individual solution or in combination with an alternative lifting solution.

The lifting device in accordance with the invention comprises a floor structure at whose lower side one or more support elements for supporting the module on the loading space of a motor vehicle are arranged. One or more carrier rollers are installed on the upper side of the floor structure. A mobile loading shelf is displaceably supported on the floor structure relatively thereto in the longitudinal direction with the aid of the carrier rollers and is thus arrangeable within a motor vehicle or its loading space so that the loading shelf can be moved out of the loading space and into the loading space in the longitudinal vehicle direction.

For this purpose, two guide modules are provided having connection points for fixing at the side walls of a vehicle loading space, with the guide modules each having at least one guide roller that rolls off on the surface of the loading shelf to guide the loading shelf along its longitudinal side.

In addition, the guide modules can each have at least one lateral guide roller that rolls off along the longitudinal edge of the loading shelf. A sufficient longitudinal guidance is thereby ensured and any unwanted movement of the loading shelf in the transverse vehicle direction is prevented.

A frame can be provided that at least sectionally runs around the loading shelf, is connected to the floor structure, and preferably comprises one or more locking elements to temporarily fix the loading shelf with respect to the floor structure.

The loading floor module or the mobile loading shelf can be manually movable. However, the integration of a suitable drive for the motor driven movement of the loading shelf relative to the floor structure is preferred. Such a drive can, for example, be implemented by at least one driven carrier roller that rolls off on the lower side of the loading shelf and thereby moves the shelf in the longitudinal direction of the vehicle. Alternatively, the drive can also be implemented by a pull rope drive.

A laser sensor system for detecting the load weight of the cargo of the loading shelf can advantageously be integrated into the floor structure to avoid an overloading and thus a mechanical overload of the body or an overload of the drive of the loading floor module.

The loading floor module also has a control unit having a control field for actuating the drive of the loading floor module.

As already stated above, the combination of the aforesaid lifting device and the load floor module in accordance with the invention provides a particularly exceptional solution to enable the loading and unloading of the trunk of a motor vehicle. It is advantageous in this case if the lifting device and the load floor module have a common, central control unit that can be connected to a bus of a motor vehicle via an interface.

The loading and unloading system in accordance with the invention should avoid the disadvantages of a complex mechanically connected lifting system in that it has a modular structure, is centrally controlled, and can be integrated in the vehicle body. It should also thus be achieved that the useful volume of the loading space is only minimally reduced by the loading and unloading system, in particular the loading floor module. The components of the invention should be implemented such that the loading and unloading system or the lifting device and/or the loading module can be integrated in the production process of the vehicle manufacturer and can thus be selected as an option in the ordering of the vehicle. A retrofitting of the vehicle should also be possible (to the extent the construction of the vehicle permits it). The work with the load should be minimized for the user during the loading and unloading. The should be minimally stressed by the handling of the load. The lifting and conveying of the load in and out of the loading space/trunk should be done by the loading and unloading system.

The control of the load manipulation should take place via a control field. The user should nevertheless bear the responsibility for the correct setting of the loading and unloading system and the handling/securing of the cargo load. The system should recognize the operation outside the specification (mechanical/electrical and thermal parameters) and warn the use to minimize the risk of damage. The individual components such as the lifting device and the loading floor module should be able to be implemented in different combination variants (e.g. degree of motorization, load capacity) to thus be able to permit different control comfort stages (partial automation of the loading and unloading process; manual operation of the loading shelf; manual/motorized opening and closing of the loading space hatchback/trunk lid, remote control).

BRIEF DESCRIPTION OF THE FIGURES

Further advantages and properties of the invention will be explained in more detail in the following with reference to the embodiments shown in the Figures. There are shown.

DETAILED DESCRIPTION

Figure 6A:
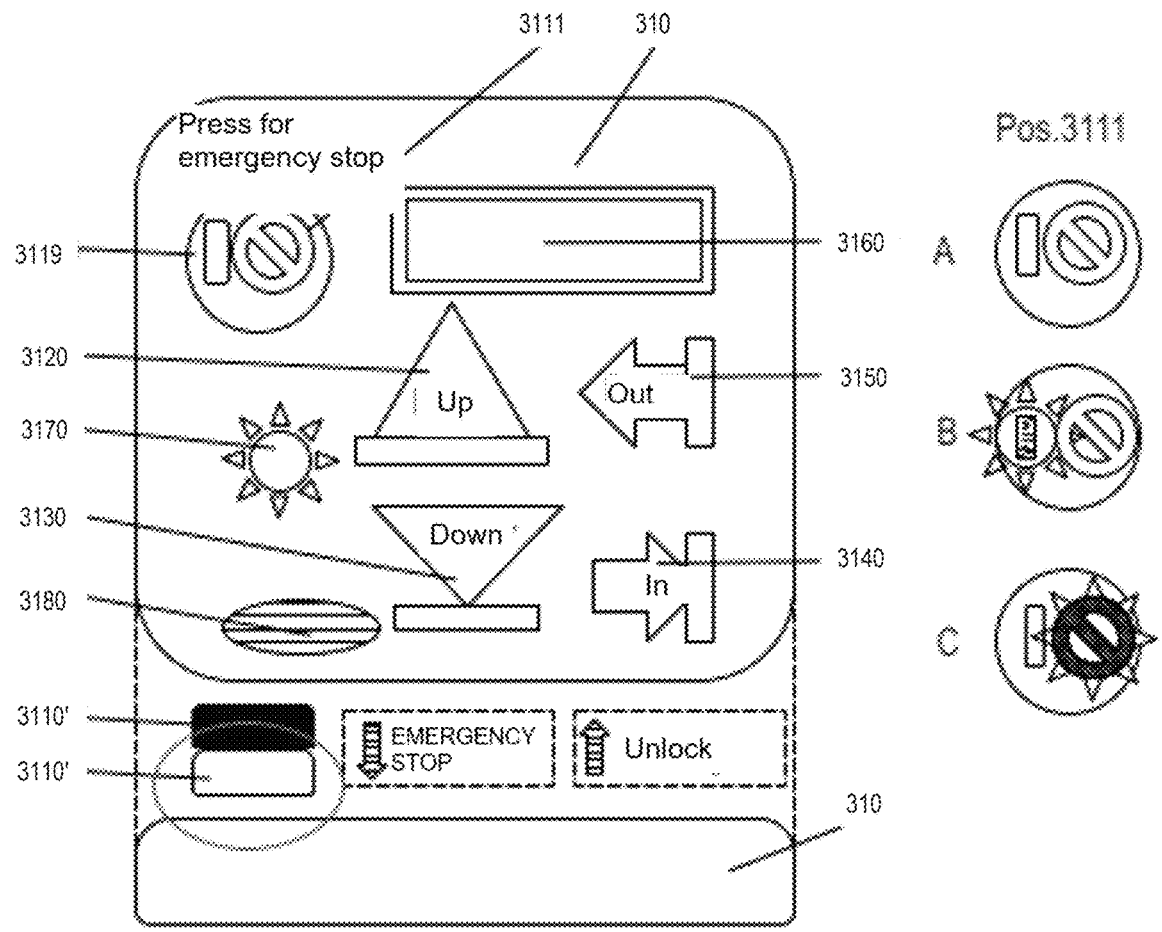
FIGS. 6a-6d: representations of different operating elements for the loading and unloading system in accordance with the invention.

The loading and unloading system for a conventional motor vehicle, in particular a passenger vehicle, will be described in detail in the following. The loading and unloading system comprises the following subcomponents that are optional in part:

1. lifting device for lifting and lowering a load (FIGS. 2a-2e);
2. loading floor module for receiving the load and transporting the load in and out of the loading space (FIGS. 3a-3e);
3. operating module(s) for implementing the interface between the user and the system (FIGS. 6a-6c);
4. load holder for suspending the load at the lifting device and for a secure anchorage in the loading space. The load holder furthermore has the function of a load container to be able to securely transport the cargo load to/from the vehicle (FIGS. 5a-5d);
5. a holding module with positioning elements for holding and supporting the lifting device: they hold the lifting device in a work position and distribute the load weight over the vehicle body (FIGS. 4a-4c);
6. a system control unit for controlling all the work processes in accordance with the user inputs and the vehicle state;
7. an additional battery that delivers additional energy if the charge state of the vehicle battery is not sufficient.

The aforesaid subcomponents will be described in detail in the following. The main component of the loading and unloading system is a lifting device in the form of an electric motor pull rope system.

Lifting Device

The pull rope system consists of an electric motor 120, a transmission 110, a brake 140, a load cable take up roller 150, load cable guide modules 180, an installation frame 160, a load cable 170 and a carrier or cross rod 130 for a load reception. Heavy items of baggage 5 (cargo load) can be raised, held, and lowered by means of the lifting device.

With the exception of the cross rod 130 that is connected to the pull rope system by a respective end of the load cable 170, the other components of the lifting device are integrated in the hatchback 7 of the motor vehicle. The ends of the load cable 17 that are connected to the cross rod 130 exit the interior of the hatchback 7 through two openings that are placed at the left and right of the lower inner margin of the hatchback 7. The length of the cross rod 130 is thus approximately equal to the width of the hatchback interior (approximately corresponds to the width of the loading space).

The item of baggage 5 (cargo load) can be suspended at any desired position on the cross rod 130 so that a repeat loading procedure can be run through to be able to load a plurality of heavy items of baggage 5 independently and to be able to position them on the loading surface 220. The load weight, overload, overheating of the load drive can be detected and the height control of the load handling can be implemented by a corresponding design of the lifting control electronics (including the sensor system).

The cross rod 130 (load carrier) is locked in a depression 19 or recess 1920 of the trim element of the hatchback 7 to avoid mechanical vibrations during the journey (when the lifting device is inactive). The fastening of the cross rod 130 in the parking position can e.g. be implemented purely mechanically by latching clips 1910 or spring handles 1910. A sensor 1940 (e.g. a Hall/contact sensor) detects whether the cross rod 130 is in the parking position. The cross rod is shown once in the parking position 130 and once in the let down position 130' in FIG. 2a. The weight of the cross rod 130 has to be dimensioned such that a sufficient tensioning of the load cable 170 is also present in the loadless state and thus a correct load cable guidance and winding is ensured at all times. In the parked position the load cables 170 are not tensioned so that the cross rod 130 can be manually pulled out of the depression 190.

The load cable 170 consists of two cable sections 171, 172 of equal length that are separately wound in opposite directions on the take up roller 150 so that, when the cable take up roller 150 rotates in one direction, the two cable ends, one each fixed at an end of the cross rod 130, simultaneously lower or rise in dependence on the direction of rotation of the cable take up roller 150. The take up roller 150 thus consists of two reels on which the cable sections 171, 173 are wound in opposite directions.

To correctly tension and guide the load cable 170, a respective cable guiding module 180 is attached at each cable outlet opening in the hatchback 7. The cable guiding module 18 ensures the correct deflection of the cable 170 over the rollers 1820, 1830 so that the load cable 7 also does not rub against the hatchback 7 or jumps out of the guide 180 in a non-horizontal position of the motor vehicle or on the balancing of the load 5. The rollers 1820, 1830 can be installed on ball bearings in a holding frame 1810.

All the components in the interior of the hatchback 7 such as the electric motor 120, the transmission 110, the brake 140, the load cable take up roller 150, and the guide modules 180 are fixed on an installation frame 160. The installation frame 160 thus satisfies the following objects.

1. Simplification of the final installation at the vehicle manufacturer—assuming a corresponding constructive design hatchback 7—since the parts can already be pre-assembled and can be put into operation outside the hatchback 7 (e.g. at the supplier's)
2. A mechanical strengthening of the hatchback 7 so that the risks of deformation of the hatchback 7 under load are minimized.
3. Implementation of the fastening/anchorage points for the holding elements that transmit the mechanical load from the lifting device to the vehicle frame.

The mechanical load can thus be transmitted to the position holder via the anchorage elements 6240.

The electric motor drive of the lifting device consists of a combination of the electric motor 120, including a spindle, transmission 110, brake 140, cable take up roller 150, operating module 1230, and vehicle cable harness connection 1260. The electronics and the regulator software of the operating module 1230 are implemented such that the brake 140 is automatically triggered (e.g. on a use of an electromagnetic brake) on a failure of the electronics or an outage of the power supply. The electric motor drive is furthermore equipped with the required sensor system 1210 to detect the following work parameters:

1. Measuring the load weight, including the detection of a mechanical overload
2. Measuring the stroke distance (load movement)
3. Detecting an overheating of the motor and/or of the transmission The signals 1250 of the overload sensors 1210 are received by the module process unit of the motor module (abbreviation "MPU" 1230) and are forwarded to the control unit via the connection bus (such as CAN/LIN) 1260. Furthermore, based on the commands the module process unit 1230 receives from the control unit, it controls the electric motor 120 and the electromagnetic brake 140 (signals 1240, 1250).

Lifting Device Holder Module

Figure 4A:
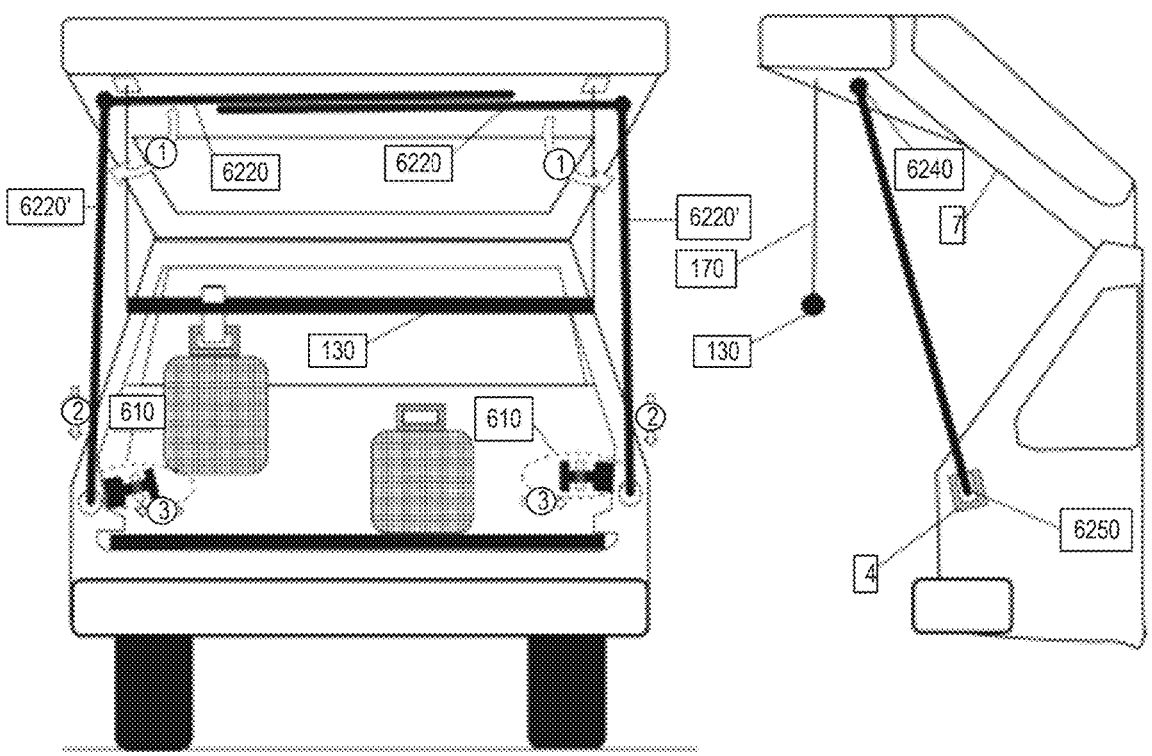
FIGS. 4a-4c: representations of the holding module of the lifting device in accordance with the invention.
Figure 4B:
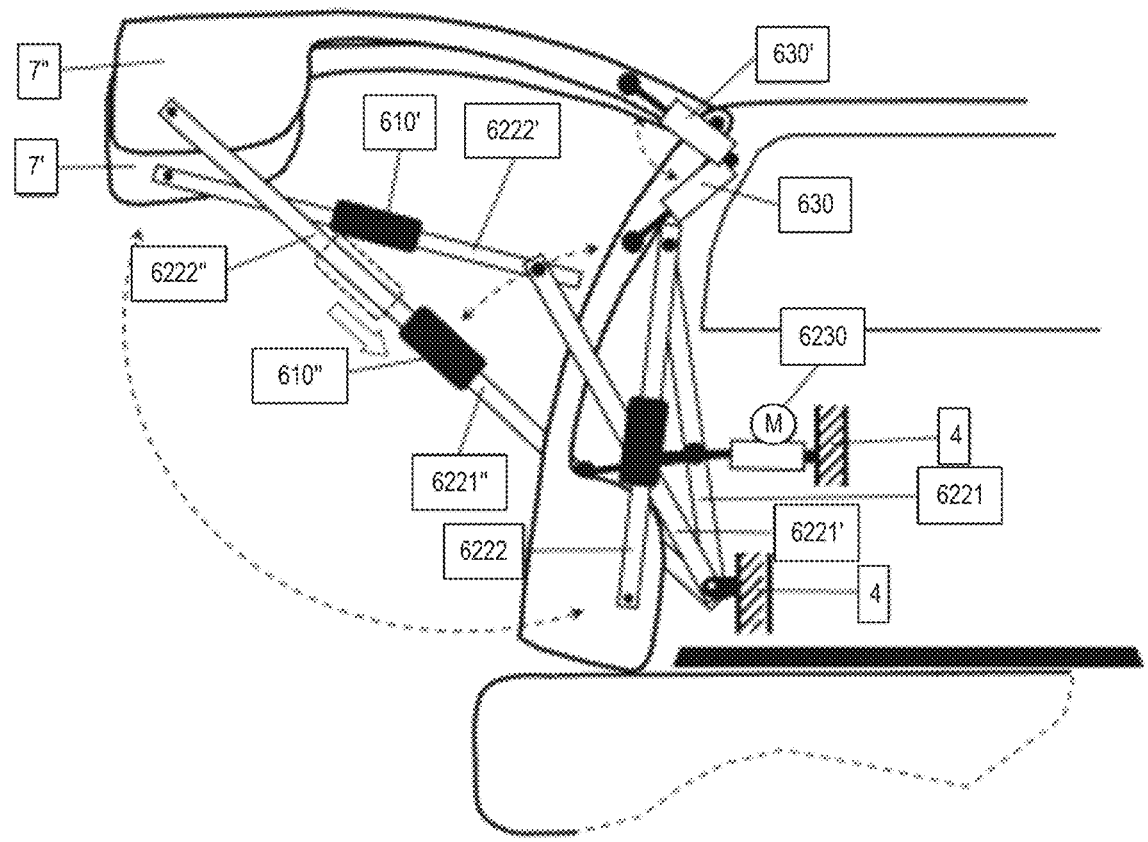
Figure 4C:
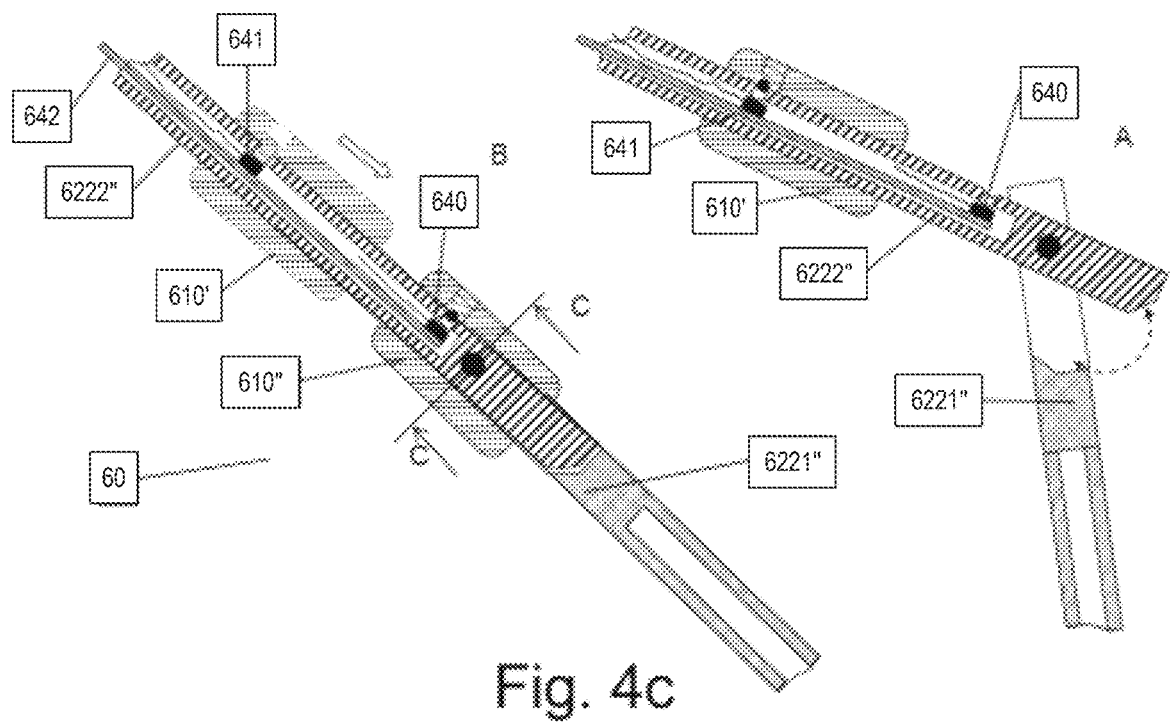
Figure 5A:
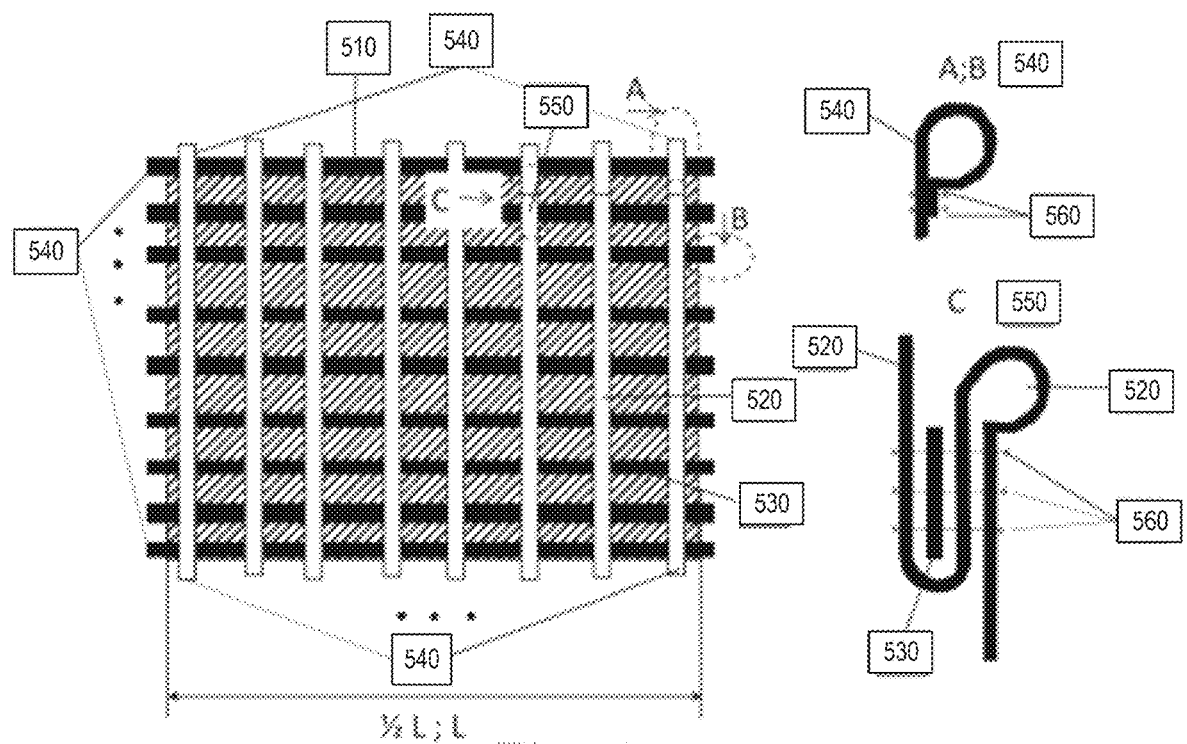
FIGS. 5a-5d: representations of the load carrier of the lifting device in accordance with the invention.
Figure 5B:
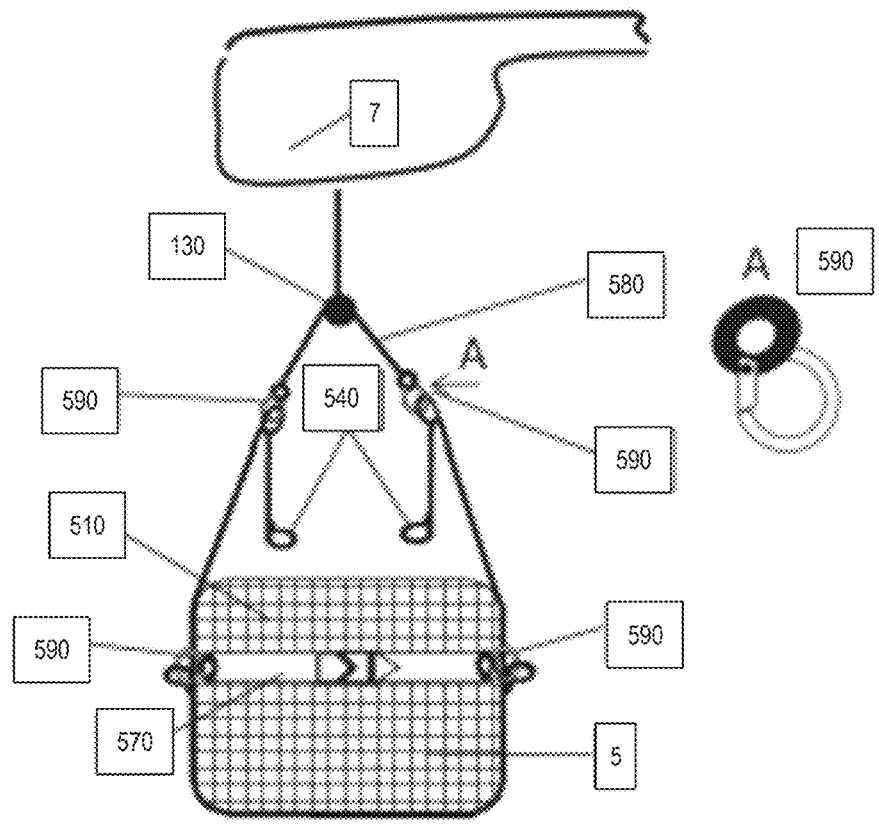
Figure 5C:
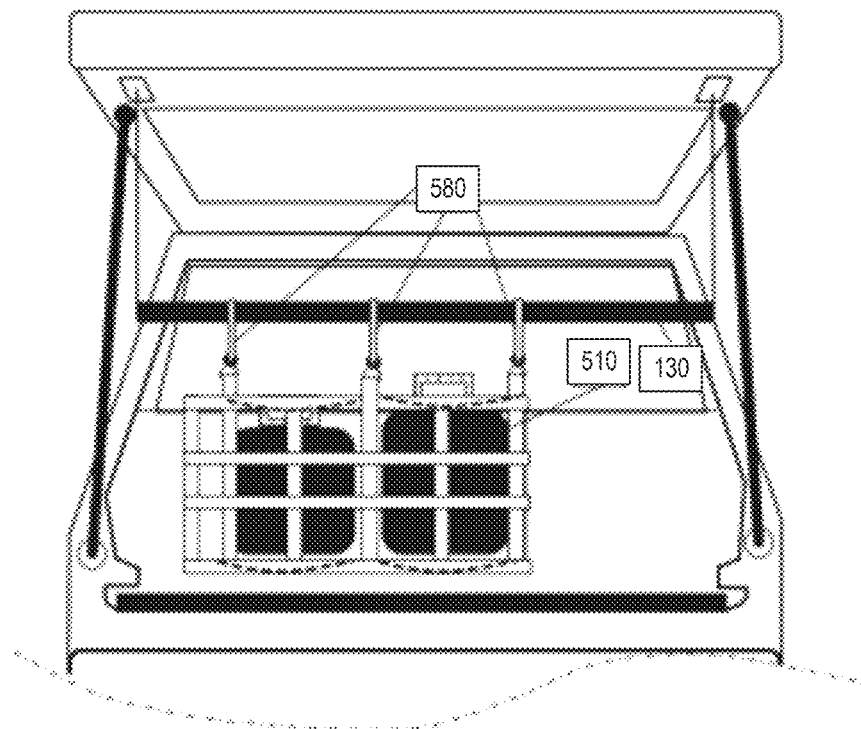
Figure 5D:
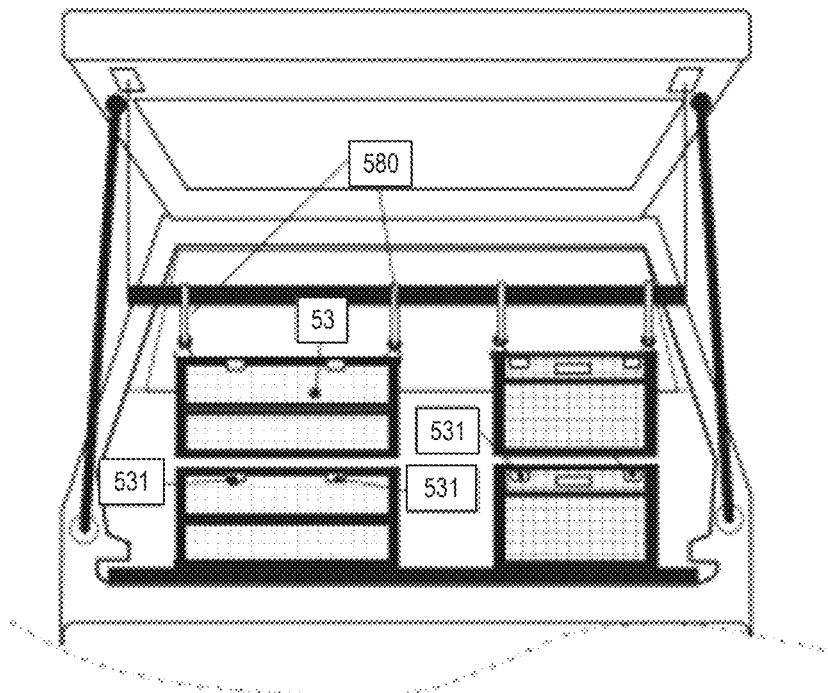

The components of the lifting device holder module are shown in FIGS. 4a to 4c. A not insignificant component of the loading and unloading system can comprise at least one holder element 60 being implemented for the mechanical positioning and support of the lifting device 10 and hatchback 7. There are generally two lifting device positioning elements 620 that are respectively arranged at the left and right of the hatchback 7. The object of the positioning elements 620 is the support or the lifting device 10 and hatchback 7 and the transmission of the mechanical load 5 onto the vehicle frame 4. This function is satisfied in that one end of each positioning element 620 is attached to the installation frame 160 of the lifting device 10—called the lifting device anchorage 6240—and the other end to the vehicle frame 4 (trunk frame)—called the vehicle frame anchorage 6250. It is thus achieved that the hatchback 7 is held in position and does not move unintentionally during the load manipulation.

Each positioning element 620 of the holder module comprises a positioning frame 6220 having the segments 6221, 6222 and an optional positioning frame actuator/position encoder 6230 together with a vehicle cable harness connection. To enable the opening of the hatchback 7 even on a failure of the onboard electrics/electronics, the hatchback 7 is driven in the direction "open" by a mechanical spring—e.g. a gas spring 630 (that is the opening of the hatchback 7 is also made possible "purely passively" by the gas spring—like the opening of a "classical hatchback"). The spring force must be dimensioned such that the increased weight of the hatchback 7 due to the integrated lifting device 10 is compensated. Once the hatchback 7 has been unlocked, the gas spring 630 provides that the hatchback 7 is partially opened. The motor 6320 then starts to move the hatchback into the end position with the aid of the two segments of the positioning frame 6221, 6222.

Each positioning frame 6220 is implemented by a mechanical encoding—called a termination element of the positioning frame 6220—such that an "exceeding" of the work position is not possible and the reaching of the work position by the user can be both optically and haptically recognized by the user and electrically by the position encoder 6230. The termination element therefore satisfies a "poka-yoke" function. The positioning elements 620 of the holder module are lowered into the body 4 in the parked position (hatchback 7 closed) and are traveled out of their parking position either manually or electrically for the work position. On the use of an electrical/hydraulic position encoder (positioning frame actuator 6230) an automated opening/closing of the hatchback 7 is thus also made possible.

The optional motor drive (positioning frame actuator 6230), that can be implemented by hydraulic/electrical solutions currently available on the market, has to be active in the closing direction of the hatchback 7, with a manual closing of the hatchback 7 also having to be possible (e.g. on a failure of the electrics/electronics). On the reaching of the work position of the hatchback 7 or of the lifting device 10, each positioning element 620 is manually locked, by the user, with the aid of a fixing element 610 to secure the work position of the lifting device 10. The correct latching position of the fixing element 610 must be unambiguously indicated to the user on the positioning element 620, e.g. by colored markings or by lettering. A sensor pair 640, 641—called fixing sensors—can optionally be used in every fixing element 610, see the embodiment in accordance with FIG. 4c. The position of the fixing element 610 with respect to the correct position of the positioning frame 6220 can thus be electronically detected and the operation of the lifting device 10 is only released on a correct position of the fixing element 610. It can now thus be detected with the aid of the sensor 641 whether the fixing element 610 is in the release position (the respective positioning frame 6220 can travel into the parking position and the hatchback 7 can be closed). It can be detected by the sensor 640 whether the fixing element 610 is in the work position (whether the respective positioning rack 6220 can correctly support the lifting device 10 and thus the hatchback 7 during the work). The sensors 640, 641 are integrated in the positioning frame 6220. They can be realized e.g. as Hall sensors that react to the proximity of the fixing element 610.

Another possibility for the implementation of the positioning frame 6220 is the use of two simple "support rods" (see FIG. 4a) that can be lowered either in the hatchback 7 or into the trunk floor in the parked position and then manually brought into the correct position and secured by the fixing element 610. In this case, the hatchback 7 has to be opened/closed manually or optionally via an external motor actuator (customary solution).

Loading Floor Module

The components of the loading floor module 20 are shown in the representations of FIGS. 3a to 3e. A mobile loading shelf 220 is provided by means of the loading floor module; it can be extended and retracted and that can work with the lifting device 10 in a synchronized manner—in the case of a fully motorized solution—to pick up the item of baggage 5 lifted by the lifting device 10 and to transport it into the baggage space and is analogously supported on the unloading. The mobile loading shelf 220 and the further technical elements required for this purpose form said loading floor module 20. The loading floor module 20 can be installed in the baggage space as an option and consists of the following elements:

1. Two guide elements 210—one guide module each on each side close to the loading edge to guide the mobile loading shelf 220 in the extended position, to hold it, and to guide it back into the loading space.
2. A mobile loading shelf 220: transports the cargo load into and out of the loading space.
3. (Fixed) floor structure 230—with carrier rollers 2310 for the uniform distribution of the loading shelf load over the floor structure 230 and thereby transmission of the load weight over the vehicle body 4.
4. Locking element(s) 250 for the locking and securing of the mobile loading shelf 220 in the retracted position. The centrifugal forces, caused by the load mass (mobile loading shelf 220 and cargo load 5) are thus transferred to the body 4 on the acceleration and braking of the vehicle.
5. A guide drive 240 of the loading shelf 220 together with a vehicle cable harness connection can optionally be attached in the floor structure 230.
6. Optionally, the reaching of the maximum load (with respect to the load rating of the loading shelf 220 and of the total loading floor module 20) can be detected by an electronic scale 280 integrated in the floor structure 230.
7. A base frame 290 for the installation of the loading floor module 20 in the trunk floor.

The loading floor module 20 is implemented such that the mobile loading shelf 220 is always guided without risk of jamming on the retraction and extension. It is thus avoided that the mobile loading shelf 220 cants, has a slanted seat, or "falls out". A guide module 210 is fastened to the vehicle body/vehicle frame 4 on each side of the mobile loading shelf 220 (with respect to the longitudinal axis of the vehicle—"x" axis). The main function of the two guide modules 210 is to restrict the movement possibility of the mobile loading shelf 220 exclusively to the x axis. This is achieved in that every guide module is equipped with guide rollers 2120 and 2130.

The limiting of the movement possibility of the mobile loading shelf 220 in the z axis (vertically) is implemented by the upper guide rollers 2120 that contact the upper side of the mobile loading shelf 220 and thus transmit some of the total weight of the mobile loading shelf 220 together with the load 4 onto the body 4 in the extended position of the mobile loading shelf 220. The upper guide rollers 2120 press the mobile loading shelf 220 onto the base shelf 230 and thus also onto the electric motor drive 240 and onto the carrier rollers 2310.

The limiting of the movement possibility of the mobile loading shelf in the y axis (horizontally—laterally) is implemented by lateral guide rollers 2130 that contact the lateral side of the mobile loading shelf 220. Two lateral guide rollers 2130 per guide module 210 are thus sufficient to suppress the movement of the mobile loading shelf 220 in the direction of the y axis.

The movement of the upper guide rollers 2120 is monitored by the operating module via rotational sensors 2140 to thus make an unexpected blockage of the mobile loading shelf 220 detectable. In addition, extension limiters 2220 that are installed on the mobile loading shelf 220 provide the mechanical securing of the shelf 220 in the "pulled out" position. It is thus ensured that the shelf 220 does not "fall out of the vehicle" even on a failure of the guide drive 240. The load distribution elements 2340, 2350 can have force sensors 280 integrated to make the total weight of the cargo load 5 measurable. The motorized guide drive 2410 that moves the mobile loading shelf 220 via a linear transmission 2420 (e.g. toothed belt axes) is also attached to the floor structure. The guide drive 2410 has a sensor system 2440, 2430 to detect a collection of water in the loading space or an overload of the guide drive 2410. The transmission of the force generated by an electric motor 2410 onto the mobile loading shelf 220 can also be implemented by means of a rubber roller 2420 especially profiled for this purpose—on a design of the system for lower total loads—or by a pull rope system for higher load capacities. Independently of the design of the electric motor drive 240, this should also enable a purely manual manipulation of the mobile base shelf 220. This can e.g. take place by an electromagnetic coupling that is seated between the electric motor 240 and the drive roller 2420 or pull rope. The electric motor drive 240 is connected via the vehicle cable harness connector to the control unit of the loading and unloading system by the vehicle cable harness connection.

The material properties of the mobile loading shelf 220 must ensure that the loading shelf 220 does not break under full load in the completely extended position. This can e.g. be implemented by the use of composite materials (carbon fibers). The total weight can be approximately calculated and the user can be warned even with a plurality of load items 5 on an exceeding of the permitted maximum weight by the possibility of the lifting device 10 to measure the load weight. The upper side of the mobile loading shelf 220 must be designed as slip resistant by the use of corresponding rubber profiles. The loading shelf 220 sensibly optionally at least sectionally comprises marginal securing profiles that avoid the cargo load sliding laterally off from the loading shelf and thus making the traveling out of the loading shelf more difficult.

The mobile loading shelf 220 must be sufficiently secured during travel operation where the mobile loading shelf 220 together with the cargo load 4 is retracted in the trunk ("transport position") so that the mobile loading shelf 220 remains in a stable position and does not damage the guide elements even at higher accelerations (direction dependent), but in particular in the x direction (travel direction). Positioning notches 2210 can be milled in the mobile loading shelf 220 both at the rear and at the front (with respect to the direction of travel) for this purpose. The two positioning notches 2210 at the front (viewed in the direction of travel) serve the positioning of the mobile loading shelf 220 by latching in positioning wedges 291 of the base frame 290. The rear positioning notches 2211 permit the blocking of the mobile loading shelf by means of locking pins 250. The contact points between the base frame 290 and the mobile loading shelf 220 have to have vibration damping properties (e.g. implementable from rubber/silicone profiles).

Operating Concept and Operating Module(s)

A uniform operating concept that consists of control and information elements can be implemented by a plurality of operating modules for the loading and unloading system in accordance with the invention. The operating concept includes the following control and information elements (they will be explained in more detail in the following paragraphs):

1. Visual information: "System defective"—e.g. red lamp, permanently lit
2. Visual information: "Overload"—e.g. red lamp, flashing
3. Visual information: "System active" (under normal load or in motion)—e.g. yellow lamp, flashing
4. Visual information: "System initializing"—e.g. green lamp, flashing
5. Visual information: "System ready, inactive"—, e.g. green lamp, permanently lit
6. Acoustic warning: "System in motion" (e.g. a buzzer that is active while the load is moved)
7. Control elements "Down", "Up", "Extend", "Retract"
8. Control element "Activate/Deactivate system/Emergency stop".
9. Optionally, a text display to simplify the operation and presentation of additional operating information The type of operating module resulting from the described operating concept can be implemented in various ways; for example as an control field 310 fastened to the vehicle, in particular to the hatchback 7 (see FIG. 6*a*), as a remote control 320 (see FIG. 6*b*), or as an applet 330 for portable devices such as smartphones, smartwatches (see FIG. 6*c*), as will be described later in this section.

The control field 310 is positioned laterally at the hatchback 7 so that a child cannot reach the control buttons of the control field 310 in the work position of the integrated lifting device 10. The control electronics are furthermore implemented such that the commands can only be activated when the hatchback is open and has been brought into the work position and the vehicle is secured in a stationary state (e.g. park brake engaged, shift lever in the "P" position). Note: the automatic attachment of the hatchback 7 in the work position and closed position can be implemented by the operating concept (opening of the hatchback via hatchback switch, remote vehicle key operation, buttons at the inner hatchback side).

The control field 310 has an On/Off button 3110 as a component. The On/Off button 3110 has two positions: in the "depressed" position 3110", the loading and unloading system is "blocked, inactive": all motor actuators are inactive, available brake elements are active (e.g. the brake 140 of the lifting device 10). When the 0/Off button 3110 is in the depressed position, further commands for the operation of the loading and unloading system are ignored (with the exception of the command "Unlock system"). In the "Pulled out position" 3110' of the On/Off button, the loading and unloading system is "unlocked" and can accept further commands.

Figure 9:
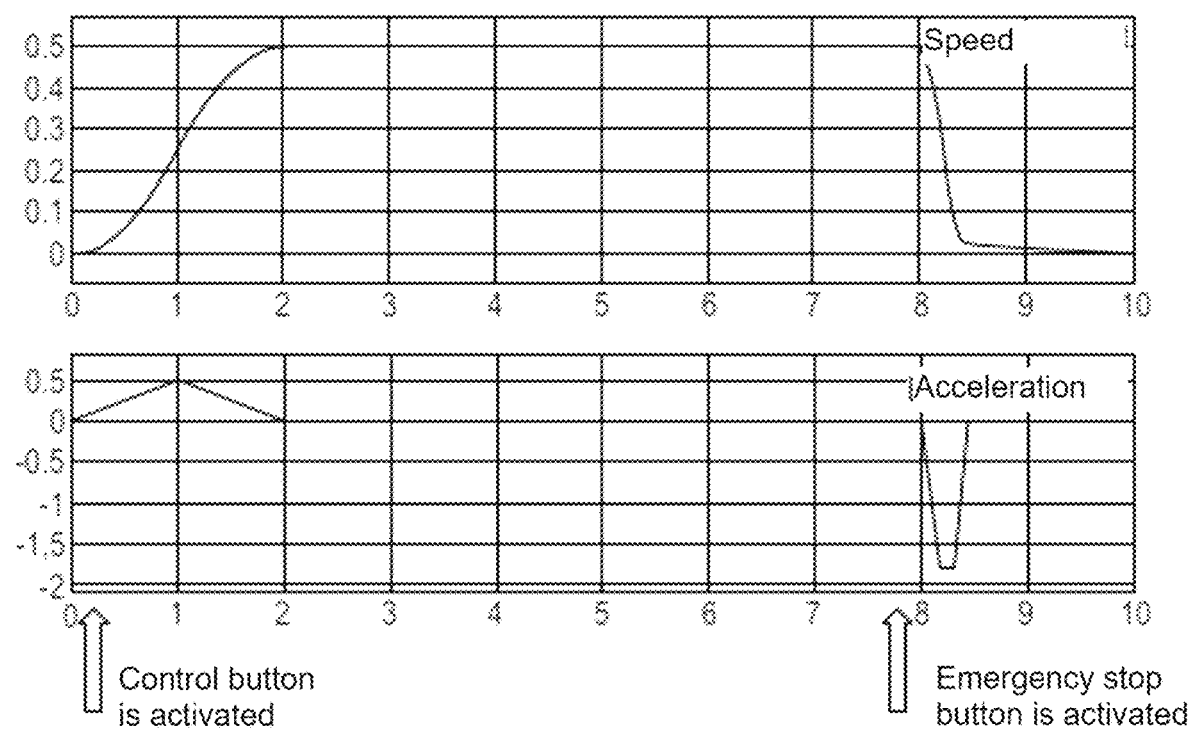
FIG. 9: braking profile of the drive of the lifting device during the emergency stop.

A status display 3111 is associated with the On/Off button 3110 that, on the one hand, permanently displays the availability of the "Emergency stop" function (e.g. dimmed, permanently lit Emergency stop symbol and illuminated "Emergency stop message text" 3111.A) and, on the other hand, displays the release status of the loading and unloading system 3111.B or intense red with a blocked system 3111.C. The respective drive is brought to a rapid stop by the activation of the brake by pressing the On/Off button 3110 while the cross rod 130 or the loading shelf 220 is in motion. The Emergency stop profile is shown for information purposes in FIG. 9.

Figure 8:
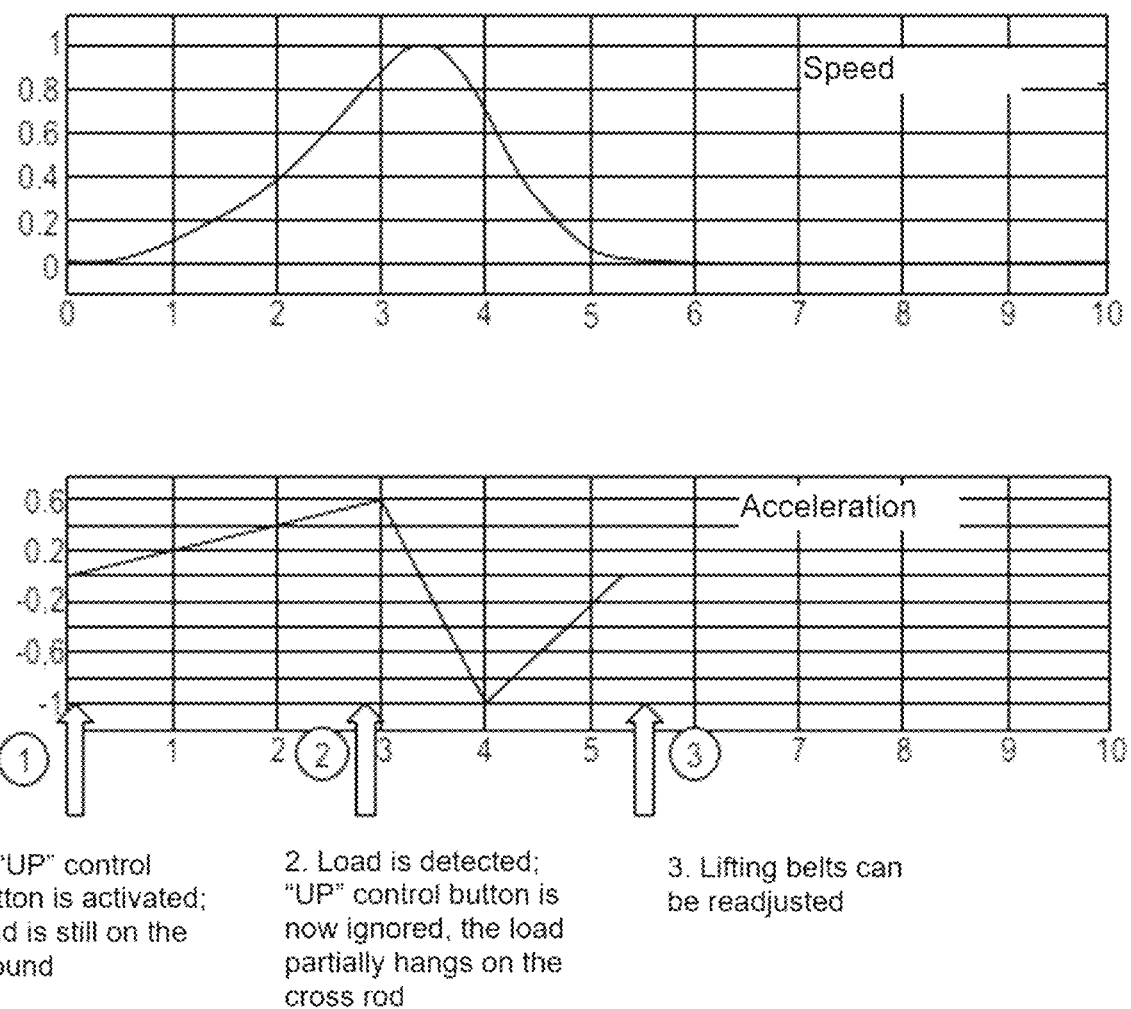
FIG. 8: speed and acceleration profile of the vertical movement of the cross rod during the load attachment.

The control field 310 has two control button as components for the lifting/lowering of the load 5 by the lifting device 10. The lifting device 10 is controlled via the buttons "UP" 3120, "DOWN" 3130. If neither of the buttons is pressed, the lifting device 10 holds the cross rod 130 together with the load 5 in the instantaneously reached position (by means of the lifting device brake 140). As long as the "UP" button 3120 is pressed, the lifting device 10 lifts the cross rod 130 and the load 5 that may be attached. On the reaching of a predefined "Limit top position", the cross rod 130 also remains in this position on a further pressing of the "UP" button 3120. The acceleration and speed profile in the vertical direction (cross load 130 under load) are shown for information purposes in FIG. 8.

The lifting device 10 can detect when the cross rod 130 is not under load (e.g. by measuring the motor load current of the motor 140). The lifting device 10 first has to raise the cross rod 130 relatively quickly after the fastening of the load 5 to the cross rod 130 (e.g. by lifting belts) as long as the load 5 does not "hang" and the belts are not tensioned. To be able to tension the lifting belts correctly (and thus to secure a correct suspension position of the load 5), the lifting device 10 has to stop the cross rod 130 before the load 5 is completely suspended at the cross rod 130 so that readjustments of the lifting belts are possible. The acceleration and speed profile for this application is shown for information purposes in FIG. 8.

As long as the "DOWN" button 3130 is pressed, the lifting device 10 lowers the cross rod 130 and the load 5 that may be attached. On the reaching of a predefined "Limit bottom position", the cross rod 130 also remains in this position on a further pressing of the "DOWN" button 3130. The control field 310 has two control buttons as components for the retraction and extension of the load 5 in and out of the trunk by the loading floor module 20. The mobile loading shelf 320 is controlled via the buttons "IN" 3140, "OUT" 3150. If neither of the buttons 3140, 3150 is depressed, the drive 240 of the mobile loading shelf 220 holds the mobile loading shelf 220 together with the load 5 in the instantaneously reached position (by means of the drive brake). As long as the "OUT" button 3150 is pressed, the mobile loading shelf 220 together with the load 5 is traveled out of the loading space 130. On the reaching of the "Limit out position", the mobile loading shelf also remains in this position on a further pressing of the "OUT" button 3150. As long as the "IN" button 3140 is pressed, the mobile loading shelf 220 together with the load 5 is traveled into the loading space 130. On the reaching of a predefined "Limit In position", the mobile loading shelf 220 also remains in this position on a further pressing of the "IN" button 3140.

The control profiles of the forces, that are applied to the cross rod 130 by the drive 120 of the lifting device 10 and to the mobile loading shelf 220 by the drive 2320 of the mobile loading shelf 220, have to be designed such that no jerky movement of the load is caused. Such control profiles are known from robotics, for example.

The control elements are visually marked so that a confusion of the control functions by the different positions of the hatchback 7 is made more difficult. The control elements are illuminated when the system is active to also enable the operation in the dark. The control field 310 has a light display 370 as a component for the signaling of the current system status so that the user has a fast overview. The light display has three colors whose meaning has already been defined above. The control field 310 has a buzzer 3180 as a component for an auditory warning when the lifting device 10 or the mobile loading shelf 220 is in motion (e.g. intermittent bleeps). The buzzer can furthermore be active when the hatchback 7 is opening or closing. The control field 310 has a text display 3160 as a component. The weight of the load 5 suspended on the cross rod 130 or the total weight of all the load items 5 located on the mobile loading shelf 220 can thus e.g. be displayed. General information (error status, servicing messages) can furthermore be displayed. The text display is optional since the information can also be displayed on other information display units (e.g. onboard computers).

Figure 6B:
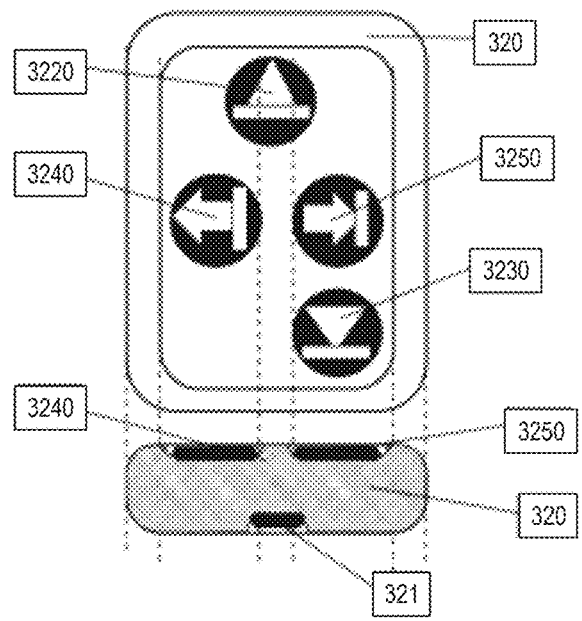
Figure 6C:
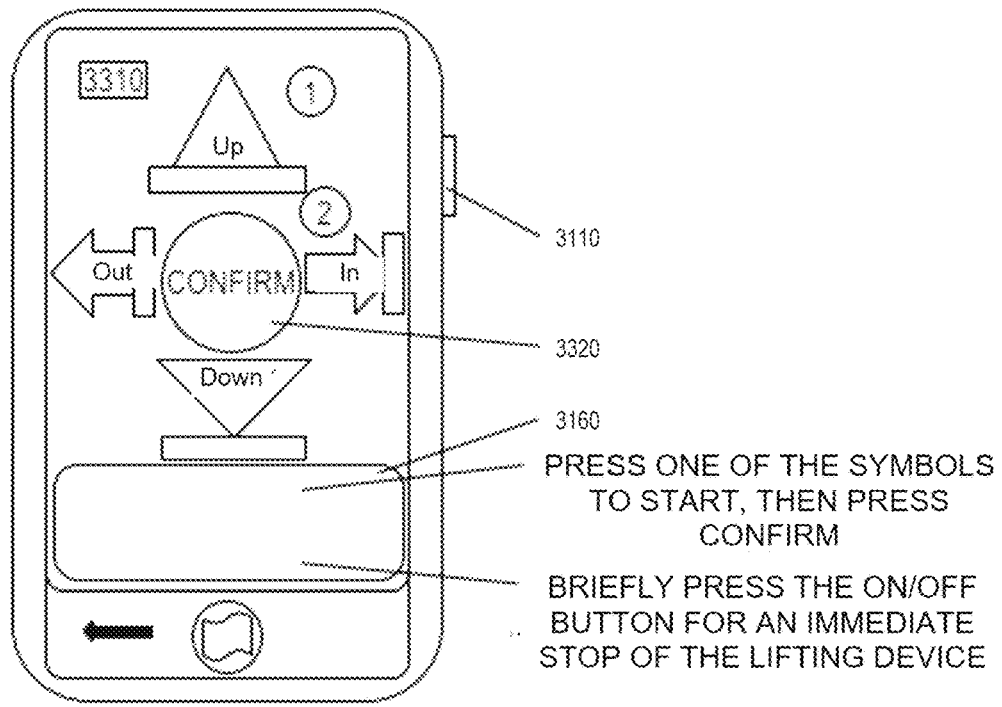
Figure 6D:
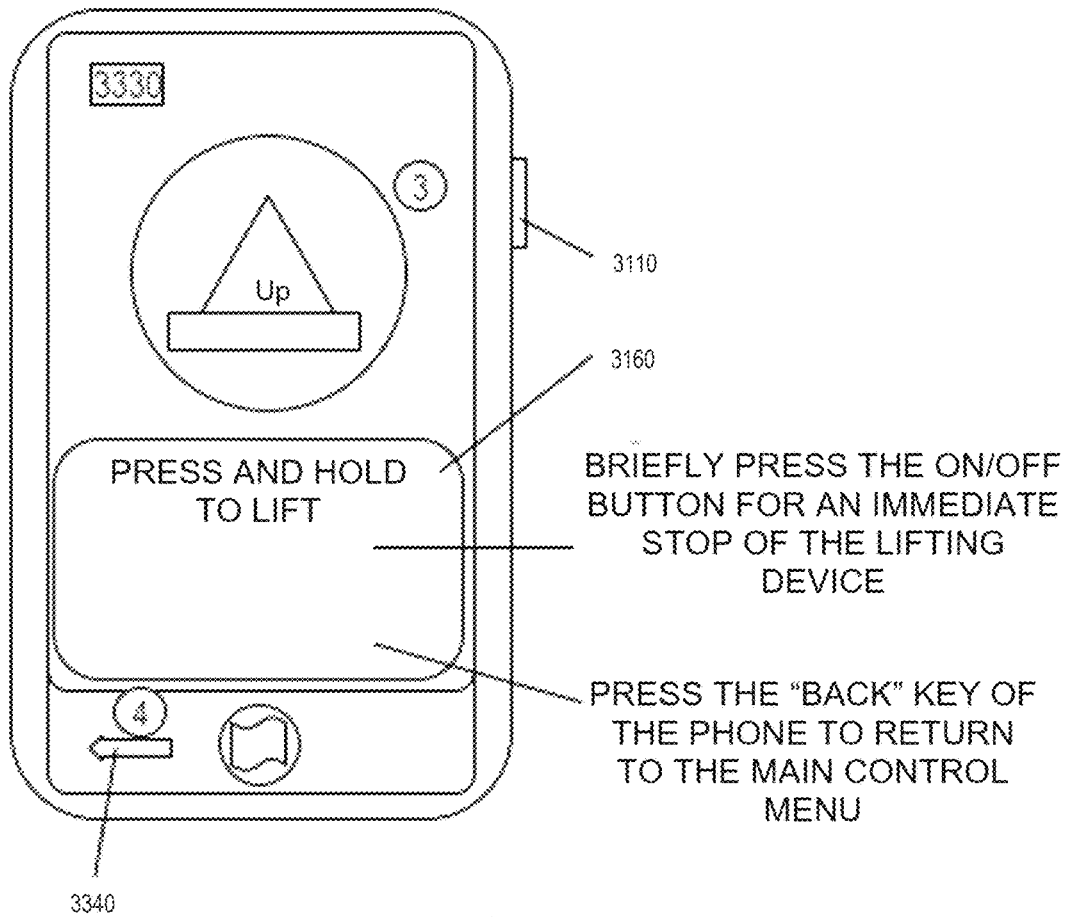
Figure 7:
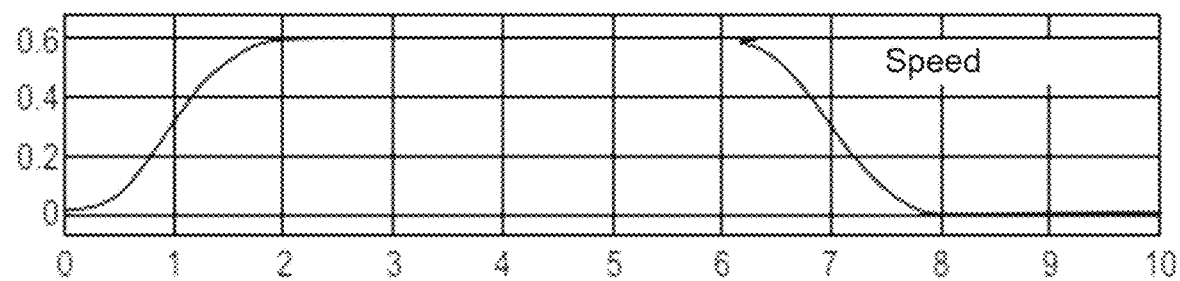
FIG. 7: speed and acceleration diagram of the drives of the lifting device or of the loading module during a braking procedure.
Figure 7:
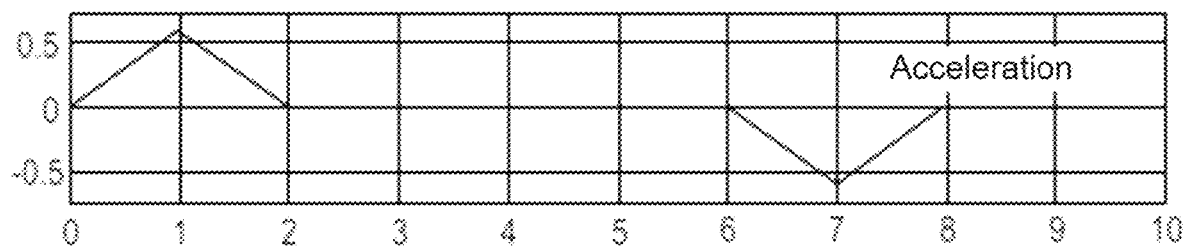

A further aspect of the operating concept, as shown above, can be implemented by an optional remote control 320 (FIG. 6b). While the control of the system via the control field 310 requires the direct proximity of the user to the control field 310, the control can be exerted more flexibly via the remote control 320 (e.g. to optionally manually orient bulky items of baggage 5). The remote control 320 can be part of the vehicle key or a separate module (e.g. a "key fob"). The remote control 320 only has the control buttons "UP" 3220, "DOWN" 3230, "IN" 3240, "OUT" 3250. The other display elements that were described as parts of the control field 310 (On/Off button 3110; light display 3170; buzzer 3180; text display 3160) are only integrated in the control field 310. The arrangement of the control buttons 3220, 3230, 3240, 3250 on the remote control 320 is such that the functionality of each button can be haptically recognized. Examples will be described in the implementation part of this document.

The control buttons can send commands to the control of the system when the vehicle is unlocked and the hatchback 7 is in the work position; these control buttons are otherwise without function. Note: the hatchback 7 is in the work position when the cross rod 130 is not in its parking position and the holder module of the lifting device 10 is fixed in the sense of the operating concept. If a remote control 320 is used for the control of the system, the control buttons 3120, 3130, 3140, 3150 can also be dispensed with for the load movement on the control field. The control field on the vehicle also has to include the following elements on the use of a remote control 320 or a control application (see FIG. 6c): On/Off button 3110, light display 3170, buzzer 3180. On a failure of the remote control 320 or of the control application, the On/Off button can be used for the "parking" of the lifting device 10. If the remote control 320 is integrated in the vehicle key, the vehicle locking button (of the remote control) can be used as an emergency stop button.

A further aspect of the operating concept is an optional "control app" 330 (in accordance with FIG. 6c) integrated in a portable device such as a cellular telephone, a tablet, a smartwatch, and the like. The portable device can communicate with the vehicle management over Bluetooth or WiFi (e.g. vehicle gateway or body controller). In this case, the control app 330 communicates with the body controller and the latter forwards the commands and status information to the control of the loading and unloading system (body controller as a relay function). If the vehicle management controller—e.g. body controller—does not support any radio communication with other devices, the communication with the control app can be implemented directly by the control of the loading and unloading system.

Every type of radio control (via remote control 320 or via control app 330) must take place over conventual encryption protocols (e.g. Bluetooth authentication authorization and encryption). The control app 330 is implemented such that the functions of the loading and unloading system can be started from a main window 3310. The main window consists of the graphical representation of the control buttons 3120, 3130, 3140, 3150 for load movement, a selection confirmation button 3320, and an information display 3160. It is ensured by the introduction of the confirmation button that an unintended function activation of the loading and unloading system cannot take place. Only the sequence "Control element/Confirmation element" may result in a function release. The function window 3330, where only one control element (corresponding to the released function) is available, is reached through the function release of a control element in the main window as described in the previous paragraph. The corresponding load movement function is activated by pressing on the graphical symbol of the control element. The main window 3310 is reached from the function window 3340 via the "Back" function 3340 that is available in all portable devices. The "Emergency stop" function 3110 can be implemented by using the "Off" button (that is likewise available in all mobile devices). A brief confirmation of the "Off" button sets the loading and unloading system into an immediate stop.

Load Carriers

A further important and advantageous aspect of the invention therefore comprises especially designed load carriers 50 (see FIGS. 5a-5d) being used to be able to safely handle the cargo load 5 during lifting/lowering and fastening in the loading space. The load carrier 50 can be implemented either by a net (load net) or by a box (load box).

Load net The load net can have the full width of the loading space ("full width net") or e.g. only half the width of the loading space ("half width net"). Different applications can thus be covered. Larger sacks such as sold in garden centers are dealt with by a full width net, smaller sacks (e.g. cement sacks) or beverage crates by a half width net.

Reinforcement bands The load net consists of a flat net 510 that is provided with perpendicularly arranged reinforcement bands (supporting reinforcement bands 520) and stabilizing reinforcement bands 530. The supporting reinforcement bands 521 have the role of being able to hang the load net at the cross rod 130 of the lifting device 10. The stabilizing reinforcement bands 530 only serve the ensuring of the positional stability of the supporting reinforcement bands 520. The load net is hung on the lifting cross rod 130 by means of belts 580 and anchors 590 (carabiners) that are fastened to the hanging loops 540. The supporting 520 and stabilizing reinforcement bands 530 are sewn together or riveted at their intersection points 560.

Hanging loops The hanging of the load net (together with the cargo load 5) on the cross rod 130 of the lifting device 10 is made possible in that hanging loops 540 are implemented at the ends of the supporting reinforcement bands 520. Intermediate hanging loops 550 are furthermore attached to some points where the supporting reinforcement bands 520 and the stabilizing reinforcement bands 530 intersect to enable an optimum suspension of the cargo load 5.

Securing loops: The stabilizing reinforcement bands 530 also have loops 533 at their ends to be able to laterally bind the load net using adjustable safety belts 570.

Load boxes: a folding box 53 (see FIG. 5*d*) especially designed for this purpose can also be used instead of the load net that is not stable in shape and so is rather usable for boxed goods/sack goods. The folding box 53 has hanging loops or eyes 531 at its longitudinal and/or transverse side(s) to be suspended at the cross rod 130 by means of suspension belts and carabiners in a longitudinal position or transverse position. The load box should be stackable to be able to support a plurality of such fully loaded boxes.

System Control Unit

The loading and unloading system comprises a modular control unit that controls all the functions of the loading and unloading system. The control unit can be implemented physically as a part of a multifunction controller (e.g. a body operating module) or as a separate controller. Only the control functions specific to the invention will be described in the next paragraphs. From a functional point of view, the control unit comprises a plurality of function blocks:
1. Control operation modes, (Control operation mode, abbrev. LF_OpMdCtrl)
2. Control lifting device 10 (Control lifter module; abbrev. LF_LftMdlCtrl)
3. Control loading floor module 20 (Control load carrier; abbrev. LF_LdrCrrCtrl)
4. Control holder module 60 (Control lifter supporting module; abbrev. LF_SprtMdlCtrl)
5. Control actuators; (Control actuators, abbrev. LF_ActCtrl)
6. Monitor functions of the loading and unloading system and initiate emergency response (Safety monitor of the integrated load handling system; abbrev. LF_IntLdhMon)
7. Control operating modules (Control user modules; abbrev. LF_UsrMdlCtrl)
8. Vehicle communication; (Vehicle communication, abbrev. LF_VehComm)
9. If an additional battery is used: Control of the additional battery (charge battery when the motor is running/Switch between the main battery and the additional battery when the loading and unloading system is in operation).

Function "Control operation mode" LF_OpMdCtrl: this function controls all the other functions of the loading and unloading system based on:
1. current status of the components of the loading and unloading system (status is determined via the monitoring function LF_IntLdhMon);
2. vehicle status (status is determined via the vehicle communication LF_VehComm);
3. activated command by user (command is determined via the operating mode control LF_UsrMdlCtrl)).

The function "Control operation mode" (LF_OpMdCtrl) furthermore sends information on the operating state of the loading and unloading system to the user via the function "Control user modules" (LF_UsrMdlCtrl). The function "Control operating mode" (LF_OpMdCtrl) furthermore sends information on the operating state of the loading and unloading system to the user via the function "Vehicle communication" (LF_VehComm).

The function "Control lifer module" LF_LftMdlCtr controls the function of the lifting device 10 based on:
1. the operating mode set by the function block "Control operation mode" (LF_OpMdCtrl);
2. the sensor information delivered by the function block "Monitoring" (LF_IntLdhMon).

The control function of the lifting device 10 is implemented such that the function "Control lifter module" LF_LftMdlCtrl sends commands to the function block "Control actuators" LF_ActCtrl and receives status information from the function block "Control actuators" LF_ActCtrl.

The function "Control load carrier" LF_LdrCrrCtr controls the function of the lifting loading floor module 20 based on:
1. the operating mode set by the function block "Control operating mode" (LF_OpMdCtrl);
2. the sensor information delivered by the function block "Monitoring" (LF_IntLdhMon).

The control function of the loading floor module 20 is implemented such that the function "Control load carrier" LF_LdrCrrCtrl sends commands to the function block "Control actuators" LF_ActCtrl, and receives status information from the function block "Control actuators" LF_ActCtrl.

The function "Control lifter supporting module" LF_SprtMdlCtrl controls the function of the lifting device holder module 60 based on:
1. the operating mode set by the function block "Control operating mode" (LF_OpMdCtrl);
2. the sensor information delivered by the function block "Monitoring" (LF_IntLdhMon).

The control function of the lifting device holder module 60 is implemented such that the function "Control lifter supporting module" LF_SprtMdlCtrl sends commands to the function block "Control actuators" LF_ActCtrl, and receives status information from the function block "Control actuators" LF_ActCtrl.

The function "Control actuators" LF_ActCtrl performs the conversion of logical commandos that were received from the different control functions LF_LftMdlCtrl; LF_LdrCrrCtrl, LF_SprtMdlCtrl) into physical control systems that are used by the different actuators to satisfy the customer functions. The function "Control actuators" LF_ActCtrl is implemented such that a calibrated profile of control signals that are specifically associated with an actuator (e.g. BLDC—Motor/Brushless DC electric motor) is associated with a logic command that corresponds to a movement profile (e.g. "Move up cross rod 130 without load 5"). Physical status information (e.g. the load is determined and any overload or a mechanical defect is detected from the phase current of the BLDC motor stator) for the regulation of the control signals. Temperature sensors furthermore enable an overload situation to be detected/plausibilized to regulate the control signals such that permanent material defects can be avoided (e.g. the electric motor is first controlled with a "slow movement profile" in an overload situation).

The function "Control actuators" LF_ActCtrl is implemented such that information that reflects the physical status of an actuator is communicated to the higher ranking operating module (LF_LftMdlCtrl, LF_LdrCrrCztl, LF_SprtMdlCtrl). The higher ranking operating module can thus associate the physical actuator status with a logical function status (e.g. "Lifting device overloaded" and communicate this status to the function module "Control operation mode" LF_OpMdCtrl.

The function "Monitor loading device" LF_IndLdhMon serves as an additional monitoring mechanism to recognize defects in the system and to initiate an emergency shutdown. For this purpose, information from the sensors is collected and evaluated together with status information of the operating modules (LF_LftMdlCtrl, LF_LdrCrrCztl, LF_SprtMdlCtrl).

The function "Control user modules" LF_UsrMdlCtrl controls the communication between the operating modules 310, 320, 330 and the function "Control operation mode" LF_OpMdCtrl. The communication between the operating modules 310, 320, 330 and the control unit consists of the following routines for this purpose:

1. identify external operating modules 320, 330: the control unit authenticates every active operating module 320, 330 via the predefined communication channels (e.g. Bluetooth for the mobile app) by means of an authentication protocol (e.g. Diffie-Hellmann protocol). Commands and status information can thus only be exchanged with their "own" operating modules.
2. Authenticated operating modules 320, 330 are then marked as ready for operation and released for command exchange. A command that is received from one of the active operating modules is executed after plausibilization. Contradictory/mutually exclusive commands are ignored.
3. Status messages are cyclically exchanged during the operation time to monitor an authenticated operating module and to recognize failures (e.g. implausible commands due to loose electrical contacts). One of a plurality of established check protocols can be used as the check protocol (question and answer sequences, checksum, sequence numbers, command echo).
4. On recognition of an operating module error, further commands are no longer accepted by the respective module; status information can be reported to the user as required via one of the vehicle information displays. In this case, a "Mechanical unlocking" should make it possible to lower any "hanging load" back to the ground.

The function "Vehicle communication" LF_VehComm secures the required information flow between the control of the loading and unloading system and the vehicle management.

The sequence of a loading and unloading procedure with the aid of the loading and unloading system in accordance with the invention is shown in chronological order in FIGS. 1a to 1e and will be described in more detail in the following. Each Figure may only show a part of a possible implementation of a part of the system so that some implementation aspects (that are not in the focus of the explanation) are not shown in every Figure.

In phase 1 (see FIG. 1a) "Reaching the work position", the hatchback 7 is opened, e.g. by the involvement of gas springs 730 and electric motor actuators 6230. The position holders 620 are moved into their work positions, which is marked by reference numeral 610'. The load carrier rod 130 is moved manually out of the parking position into the standby position (reference numeral 130') to be able to take up the placed own item of baggage 5 in the subsequent steps.

Figure 1A:
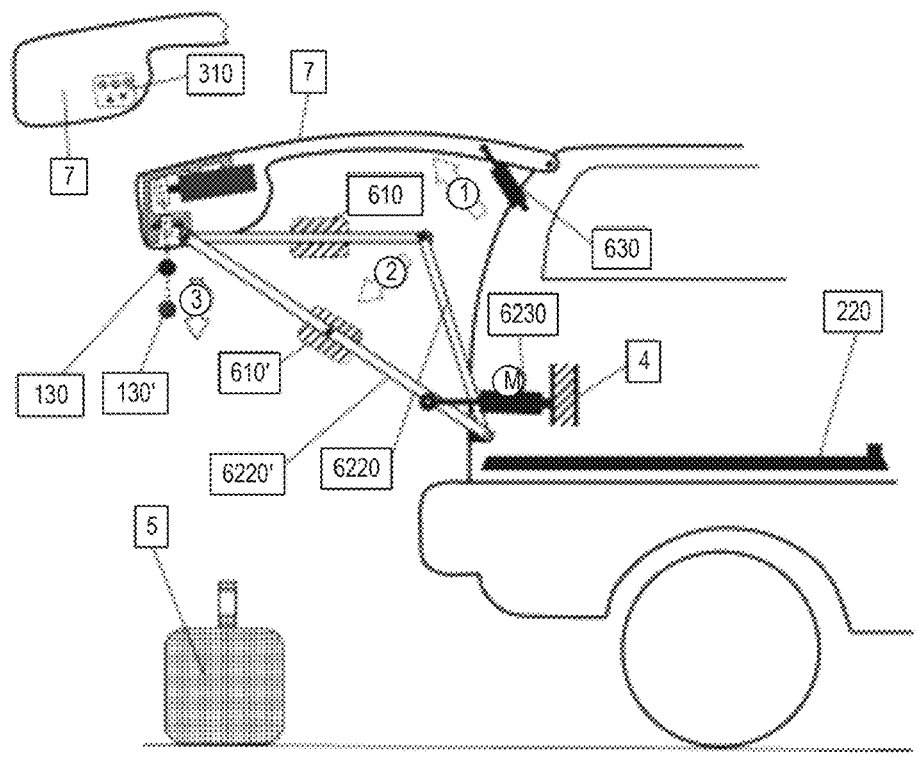
FIGS. 1a-1e: images of the loading and unloading system in accordance with the invention in a chronological sequence during the lifting of a load.
Figure 1B:
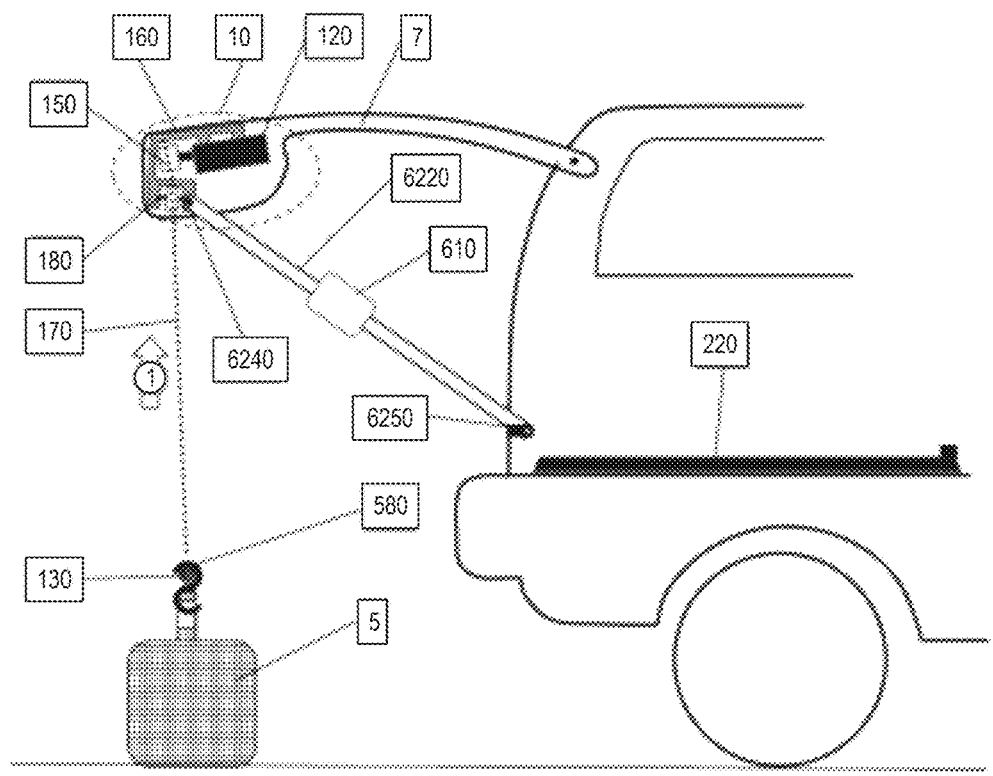

FIG. 1b shows phase 2 "Load take-up". Here, an item of baggage 5 that is held at the cross rod 130 by means of a fastening element 580 is lifted into the highest position by the lifting device 10 with the aid of the two load cables 170. Since the control unit can determine the distance of the load cable 170, the control unit can also calculate how high the load piece 5 has to be raised to be able to then lower it on the loading floor 220.

Figure 1C:
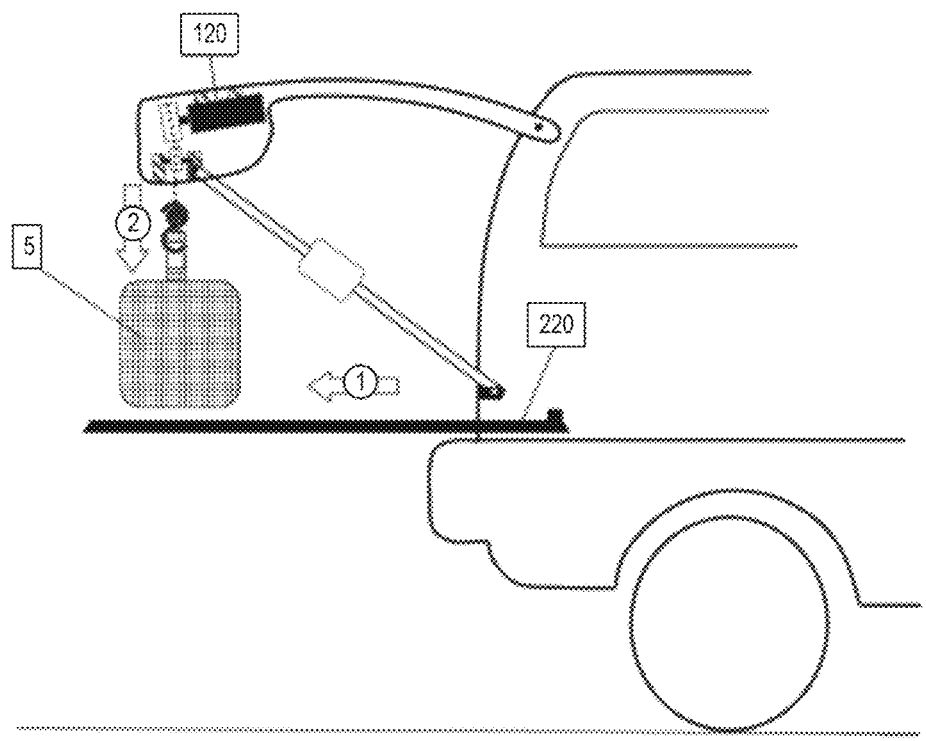

In phase 3 "Loading", shown in FIG. 1c, the mobile loading shelf 220 is extended while the load 5 has been raised sufficiently to avoid any collision with the mobile loading shelf 220. Once the loading shelf 220 is in the position for the load take-up, the load 5 is lowered on the loading shelf 220.

Figure 1D:
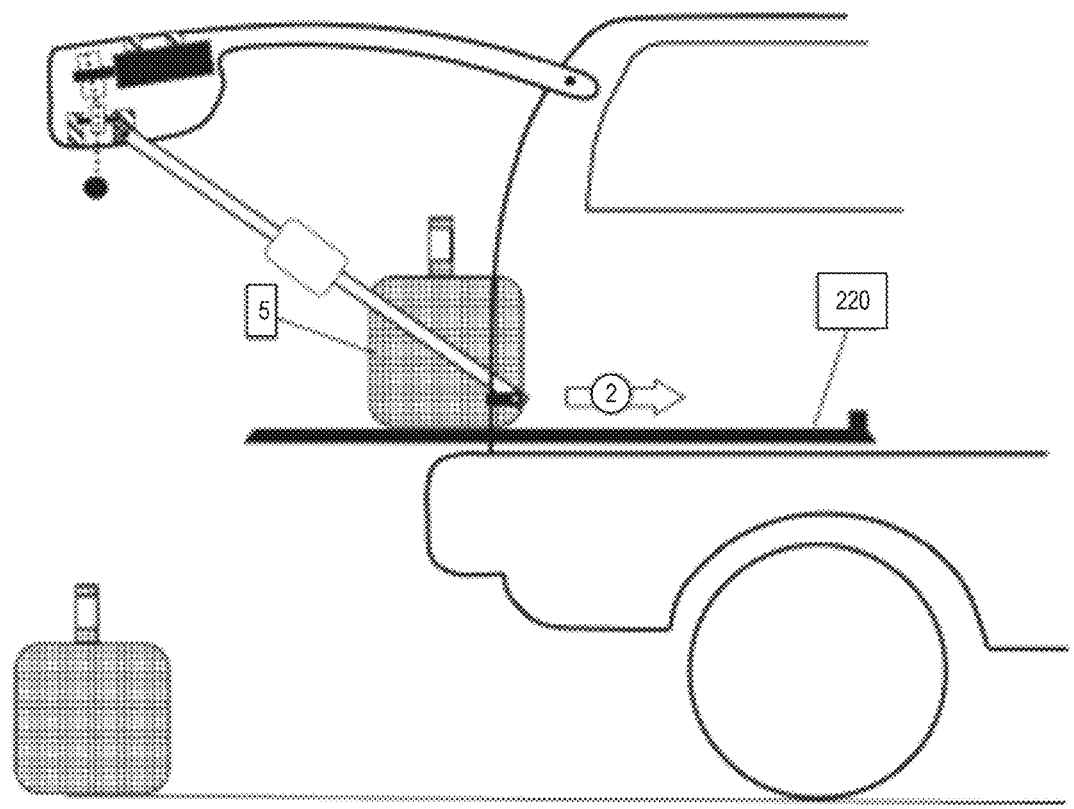
Figure 1E:
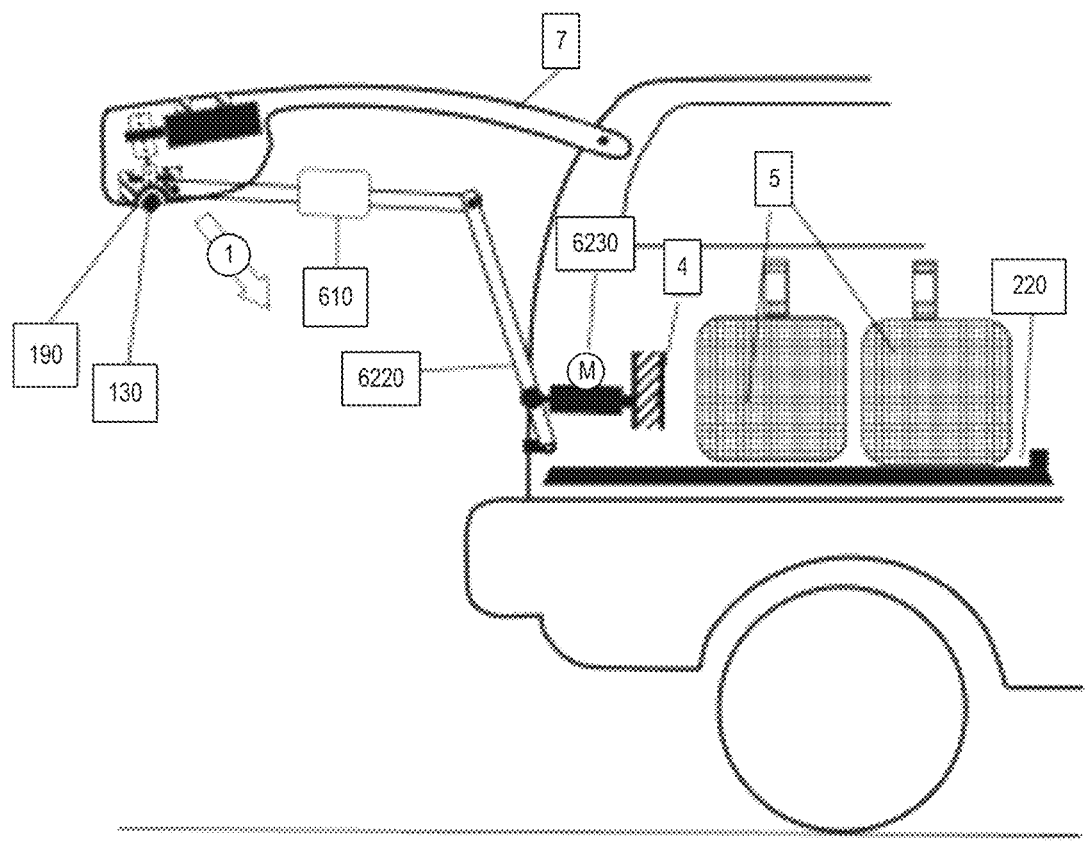
Figure 2A:
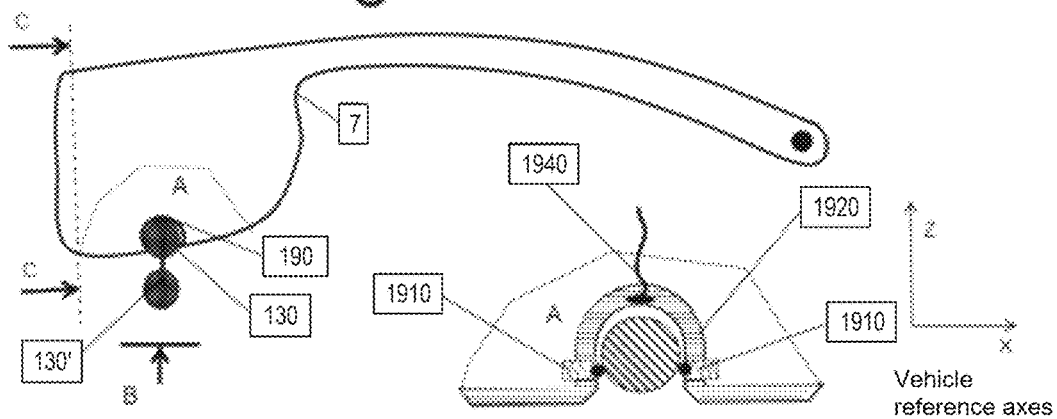
FIGS. 2a-2e: representations of the lifting device in accordance with the invention.
Figure 2A:
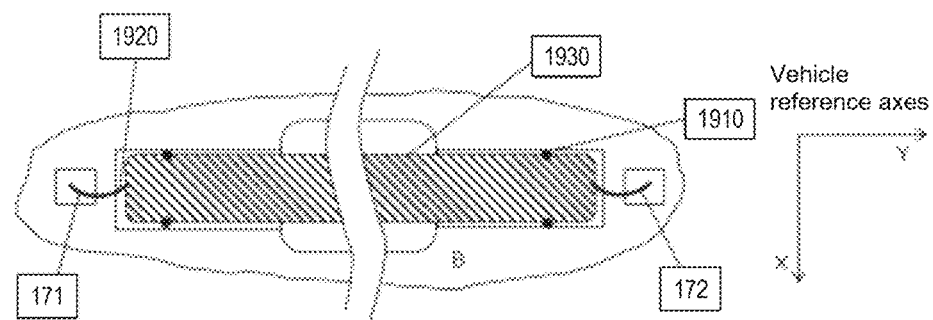
Figure 2B:
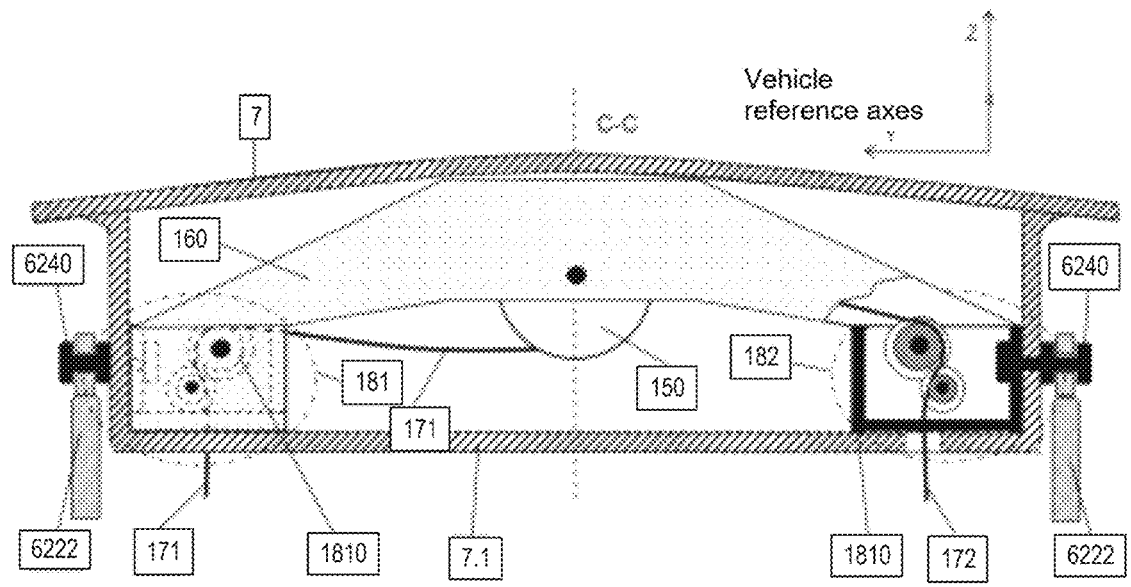
Figure 2C:
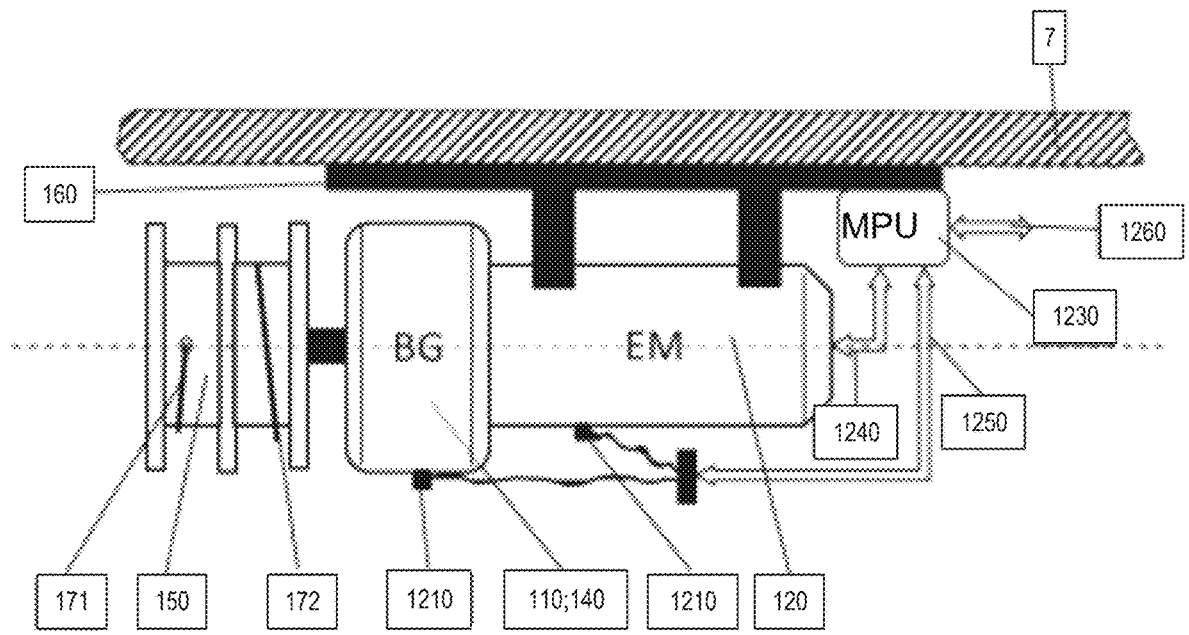
Figure 2D:
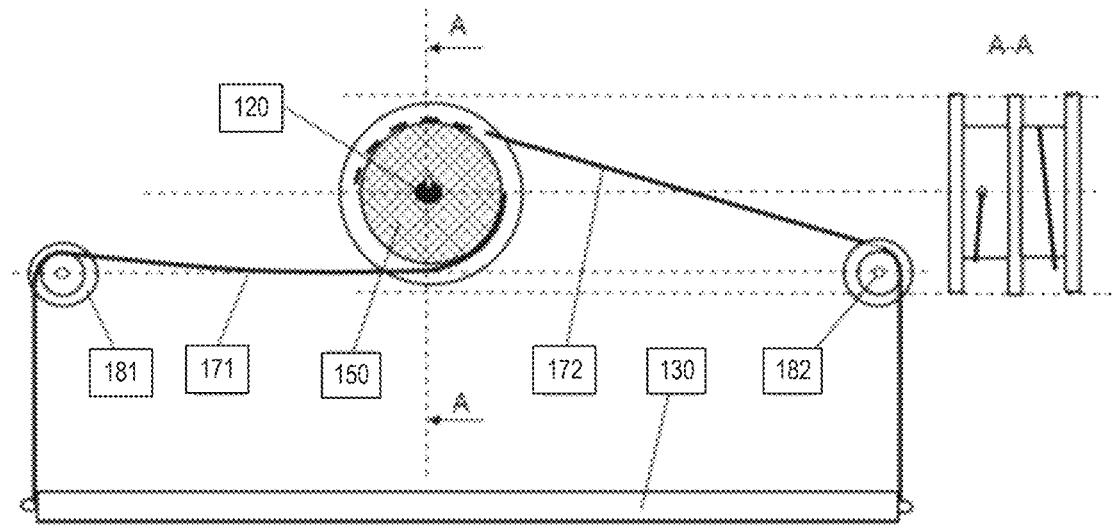
Figure 2E:
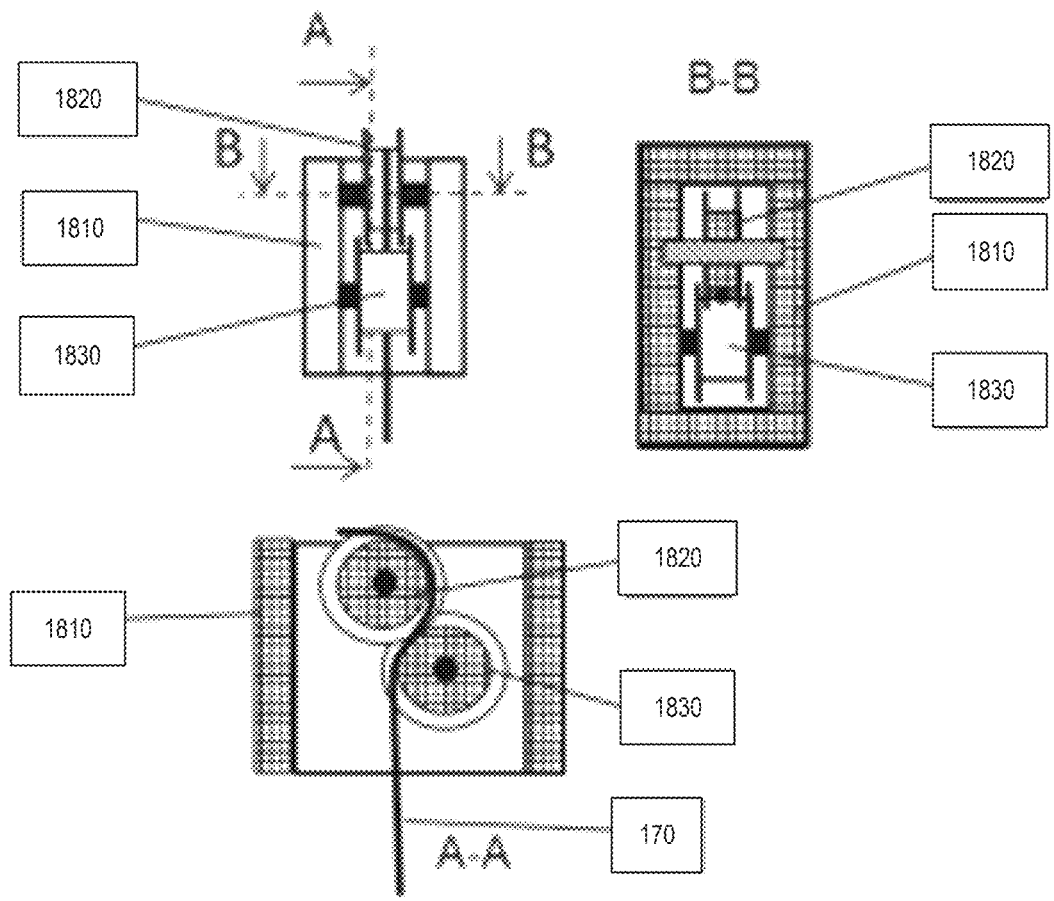
Figure 3A:
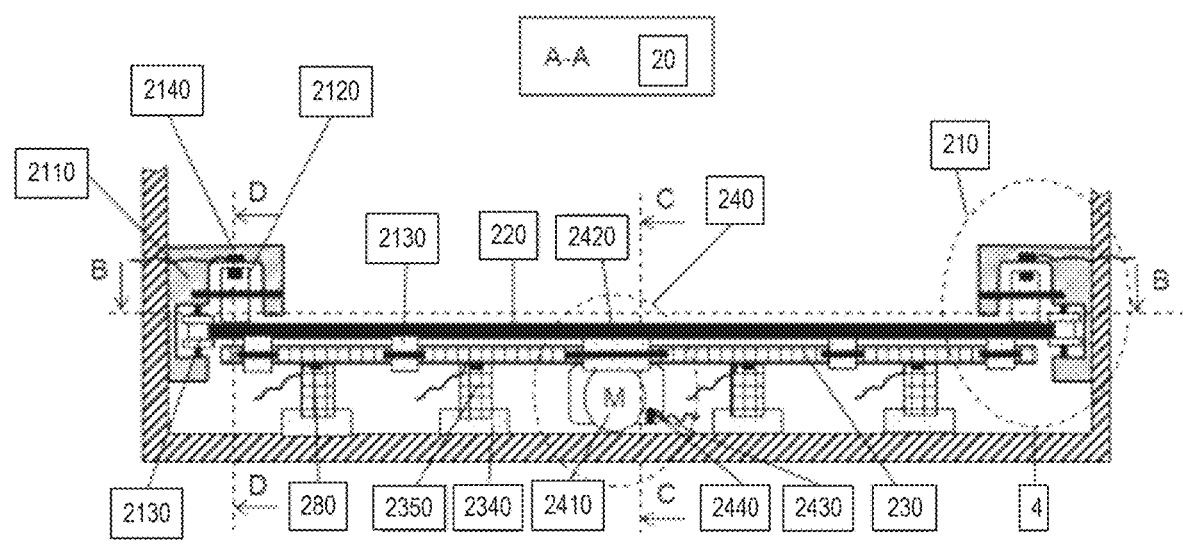
FIGS. 3a-3e: representations of the loading floor module in accordance with the invention.
Figure 3B:
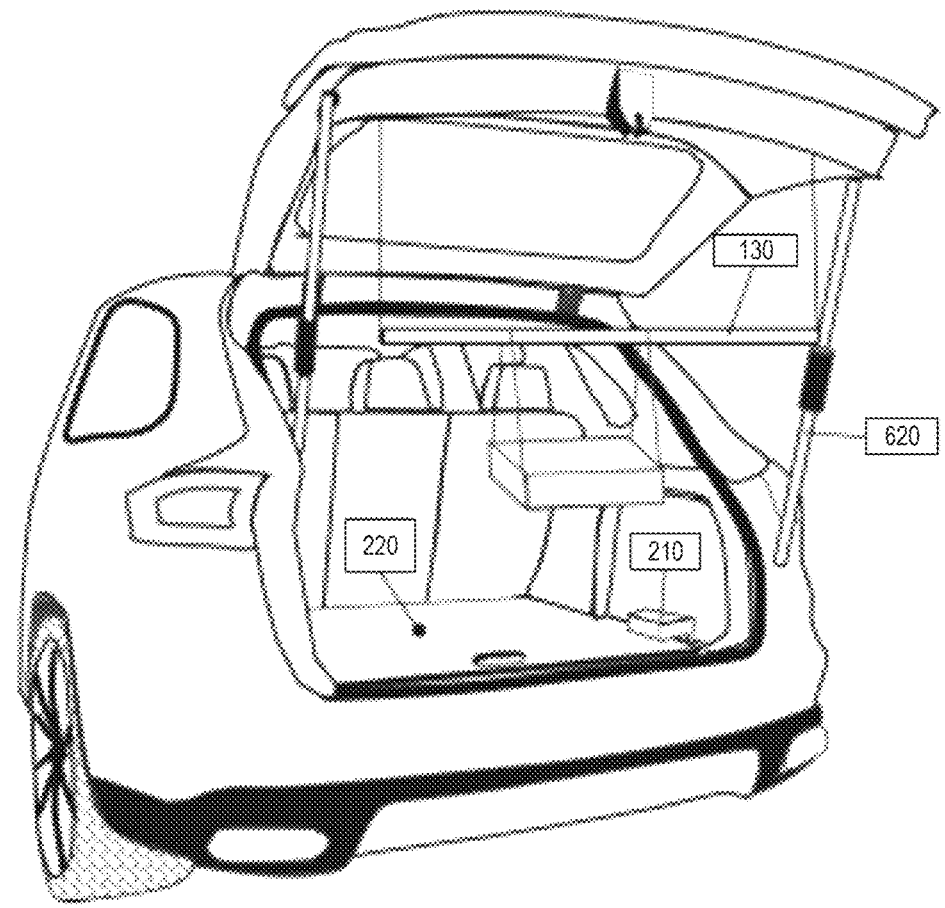
Figure 3C:
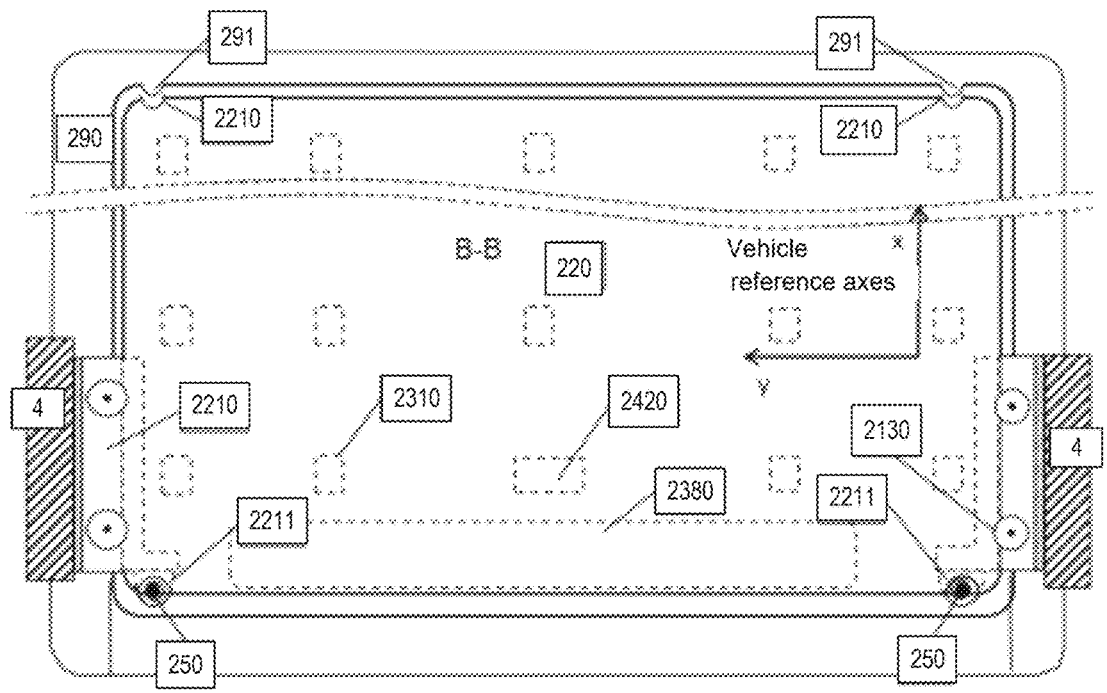
Figure 3D:
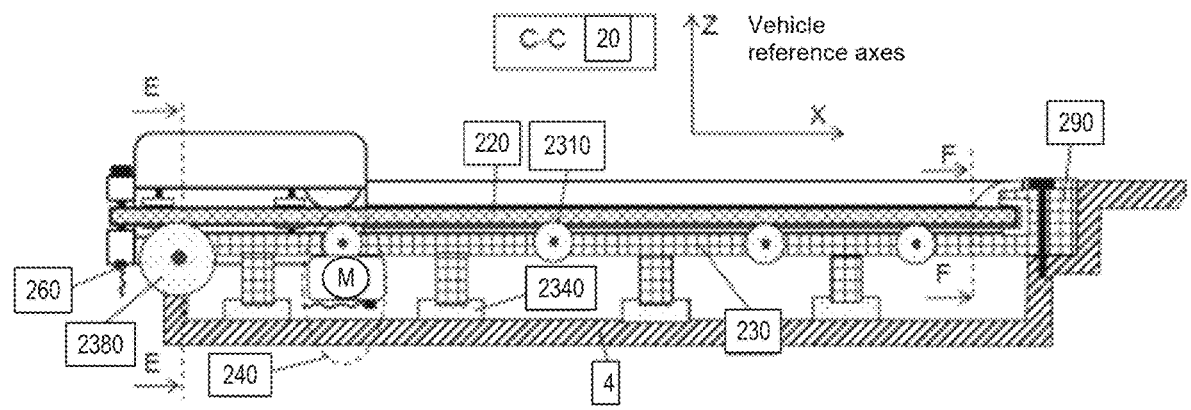
Figure 3E:
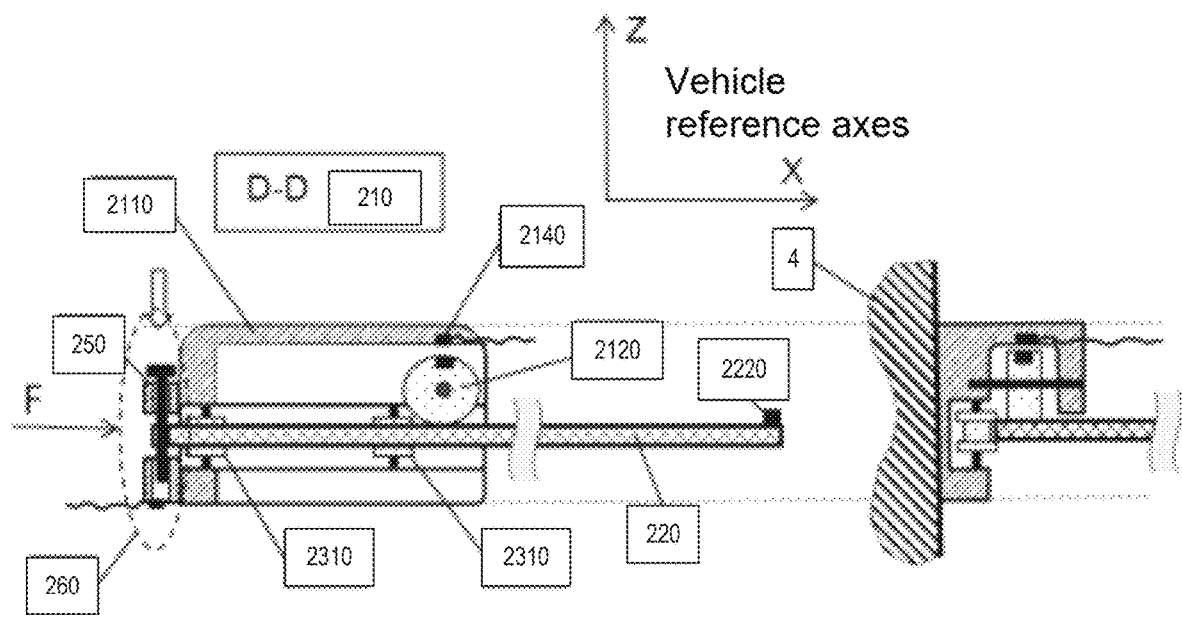

In phase 4, "Stowage", shown in FIG. 1d, the mobile loading shelf 220 is again retracted into the trunk. Phases 2 to 4 can be repeated multiple times due to the regulable positioning of the mobile loading shelf 220 to be able to load a plurality of load pieces 5. In the phase "End of loading", shown in FIG. 1e, the loading shelf 220 is locked, the load carrier rod 130 is fastened to the trunk lid (parking position) and the position holder 610 is moved into the parking position.

The invention claimed is:

1. A motor vehicle comprising:
   a hatchback; and
   a lifting device integrated into the hatchback and comprising an electric motor pull rope system that includes:
      at least one load cable;
      at least one electric motor driven take up roller for reeling the load cable up and off; and
      a cable guide by means of which at least two cable harnesses that extend in parallel can be led out of the hatchback in a direction of a floor, wherein the cable harnesses extending in parallel as load reception means are connected at an end side by means of a carrier rod;
   wherein at least one installation frame is provided at which the at least one take up roller, including an electric motor drive, and the cable guide is supported, with the installation frame being designed such that the installation frame extends within the hatchback over a total width of the hatchback in an installed position;
   wherein at least one positioning element is provided and is supported on the installation frame at the end side; and
   wherein other ends of the at least one positioning elements are supported at the vehicle frame of a motor vehicle such that a direct force transmission from the installation frame into a vehicle body is possible.

2. The motor vehicle in accordance with claim 1, wherein each cable harness has a respective roller arrangement to guide the load cable out of the hatchback at a desired exit point, with the roller arrangement being supported at free ends of the installation frame, while the at least one take up roller is supported centrally between the roller arrangement at the installation frame.

3. The motor vehicle in accordance with claim 1, wherein the load cable consists of two separate cables or separate cable sections that have an identical length and the take up roller has two reels for winding and unwinding the cables or cable sections disposed next to one another on a roller axis.

4. The motor vehicle in accordance with claim 1, wherein:
the electric motor drive of the take up roller comprises an electric motor, including a spindle, a transmission, and a brake;
the brake includes an emergency brake and a manual release function; and/or
the brake is equipped with a sensor system for measuring:
a taken up load weight;
a stroke distance; and/or
an operating temperature.

5. The motor vehicle in accordance with claim 1, wherein the at least one positioning element comprises lever kinematics that are adjustable by an opening/closing movement of a vehicle hatchback.

6. The motor vehicle in accordance with claim 5, wherein the at least one positioning element comprises a fixing means for fixing the lever kinematics, with at least one sensor system being provided for detection of a state of the fixing means or of the lever kinematics.

7. The motor vehicle in accordance with claim 6, comprising a control unit having at least one operating module that is configured to control a release of the electric motor drive of the take up roller in accordance with an operating concept and/or in dependence on a state of the positioning elements or of the lever kinematics and/or of the vehicle.

8. The motor vehicle in accordance with claim 5, wherein an electric or electrohydraulic drive is provided to actuate the lever kinematics of the positioning element.

9. The motor vehicle in accordance with claim 1, further comprising:
a loading floor module integrated into a trunk;
wherein the trunk comprises:
a floor structure, wherein, at a lower side of the floor structure, one or more support elements are arranged for support on a loading space floor of a motor vehicle and one or more carrier rollers are installed at an upper side;
a loading shelf that is displaceably supported on the floor structure in a longitudinal direction relative to the floor structure with an aid of the one or more carrier rollers; and
at least two guide modules having connection points for fixing at side walls of a vehicle loading space, with the guide modules each having at least one guide roller that rolls off on a surface of the loading shelf to guide the loading shelf along longitudinal sides.

10. The motor vehicle in accordance with claim 9, wherein the guide modules each have at least one lateral guide roller that rolls off along a longitudinal edge of the loading shelf.

11. The motor vehicle in accordance with claim 9, wherein a frame is provided that at least sectionally runs around the loading shelf, is connected to the floor structure, and comprises one or more locking elements to temporarily fix the loading shelf with respect to the floor structure.

12. The motor vehicle in accordance with claim 11, wherein:
at least one drive is provided for motorized movement of the loading shelf relative to the floor structure and for drive of at least one carrier roller; and/or
at least one load sensor system integrated in the floor structure is provided to detect a load weight of a load on the loading shelf.

13. The motor vehicle according to claim 9, further comprising:
a loading and unloading system for a motor vehicle comprising the lifting device; and
at least one retractable and extendable loading floor module.

14. The motor vehicle according to claim 9, further comprising: at least one loading floor module installed in the loading space of the motor vehicle and having a loading shelf extendable out of the trunk.

* * * * *